April 30, 1963 N. F. BROWN 3,087,334
FLUID METERING AND SAMPLING APPARATUS AND CONTROLS THEREFOR
Filed Jan. 14, 1957 10 Sheets-Sheet 1
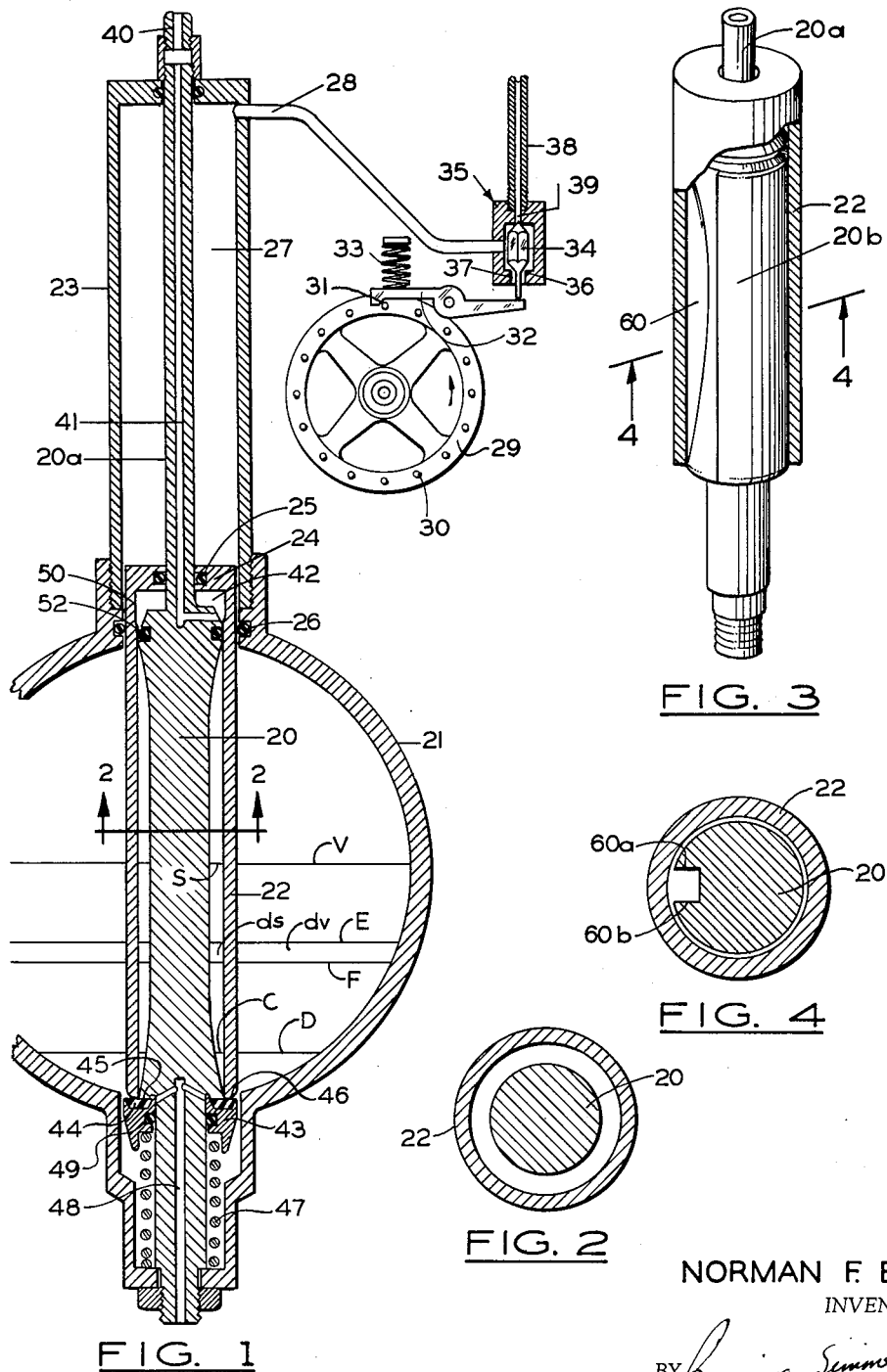
NORMAN F. BROWN
INVENTOR.
BY *Browning, Simms & Hyer*
ATTORNEYS April 30, 1963 N. F. BROWN 3,087,334
FLUID METERING AND SAMPLING APPARATUS AND CONTROLS THEREFOR
Filed Jan. 14, 1957 10 Sheets-Sheet 4

NORMAN F. BROWN
INVENTOR.

BY Browning, Simms & Hyer

ATTORNEYS

April 30, 1963  N. F. BROWN  3,087,334
FLUID METERING AND SAMPLING APPARATUS AND CONTROLS THEREFOR
Filed Jan. 14, 1957  10 Sheets-Sheet 5

NORMAN F. BROWN
INVENTOR.

BY *Browning, Simmons & Hoyer*

ATTORNEYS

NORMAN F. BROWN
INVENTOR

BY Browning, Simms & Hyer

ATTORNEYS

April 30, 1963  N. F. BROWN  3,087,334
FLUID METERING AND SAMPLING APPARATUS AND CONTROLS THEREFOR
Filed Jan. 14, 1957  10 Sheets-Sheet 9

NORMAN F. BROWN
INVENTOR

BY Browning, Simins & Hyer

ATTORNEYS

United States Patent Office

3,087,334
Patented Apr. 30, 1963

3,087,334
FLUID METERING AND SAMPLING APPARATUS
AND CONTROLS THEREFOR
Norman F. Brown, Longview, Tex., assignor to U.S.
Industries, Inc., New York, N.Y.
Filed Jan. 14, 1957, Ser. No. 634,016
24 Claims. (Cl. 73—198)

This invention relates to improvements in liquid metering apparatus of the type in which a measuring vessel is alternately filled and emptied in order to measure the volume of the liquid. In another aspect, it relates to a new and novel apparatus for taking a representative cross-section sample from a vessel. In another of its aspects, the invention relates to an improved combination metering and sampling apparatus. In still another aspect, it relates to an improved pilot or shuttle mechanism and to an improved pressure operated actuator.

It is frequently desirable to take a sample from a vessel which sample is accurately representative of the fluid in the vessel. Since most vessels are non-rectangular in vertical cross-section, the volume of liquid per increment of depth in the vessel is not a constant but instead will vary from one level to another in the vessel. Taking the example of a spherical tank, there is considerably less volume of liquid per unit of depth adjacent the bottom of the tank than there is for the same unit of depth at about the mid-point of the total depth of the tank. Therefore, to take a truly representative cross-section sample from a vessel of non-rectangular cross-section, different amounts of sample must be withdrawn at different vessel depths in order that the percentage of liquid withdrawn at each depth is the same as that withdrawn at all other depths. As will be seen below, the accomplishment of this is one of the principal objects of this invention.

As indicated above, this invention also relates to the improvements in the so-called "batching" type of meter. In this type of meter, a vessel of known volume is alternately filled and emptied and the number of fillings or emptyings counted so that the metered volume can be arrived at. To obtain the maximum accuracy with such a meter, it is necessary that the valves controlling flow into and out of the metering vessel be positively operated in the necessary sequence such that liquid never flows into the vessel at the same time it is flowing out. Of equal importance, the valving must also be such that the quantity of liquid trapped in the vessel between the inlet and outlet valves is exactly the same each time the vessel fills and such that the quantity discharged from the vessel is uniform. The provisions of apparatus which allow these requirements to be met in an improved manner is one of the general objects of this invention.

It is also another general object to provide a sampling apparatus capable of taking an accurate representative sample from a vessel of non-rectangular cross-section, the volume of the sample portions taken at different depths in the vessel being the same function of depth as the volume of fluid in the vessel is a function of depth.

Another object is to provide such a sampling apparatus in which the volume of the sample taken can be very small in comparison with the volume of the vessel and yet the sample will be truly representative of the fluid in the vessel.

Another object is to provide such a sampling apparatus in which the sample is taken simply by telescoping a sample tube over a sample core, the core being so contoured or shaped that the volume of sample trapped between the core and the tube will vary along the length of the core in the same manner as the volume of liquid being sampled varies along the length of the core.

Another object is to provide such a sampling apparatus with an improved means for discharging the sample after it is isolated into a sample receiver and for readily effecting such discharge even though the receiver is at a lower pressure than is the vessel from which the sample is taken.

Another object of the invention is to provide such a sampling apparatus in combination with an improved batch type meter, the arrangement being such that not only is there a positive and accurate metering of the liquid but also a sampling thereof which is truly representative of each batch of liquid metered.

Another object is to provide such a metering and sampling apparatus in which emptying of a metering vessel after it has been filled cannot be commenced until the sample has been isolated from the contents of the vessel, whereby the sample taken will contain portions from all liquid strata in the vessel.

Another object of the invention is to provide an improved valving and sampling apparatus for use with a vessel which will insure that not only is the same volume of liquid passed through the vessel for each metering cycle, but also that the sample taken will contain portions from all depths of the vessel so that it is truly representative of the liquid therein.

Another object of the invention is to provide in a fluid meter of the batching type, an improved valving arrangement such that all the valving operations necessary to alternately fill and empty the metering vessel are performed by single actuating means to thereby insure that no sequence other than the desired one can occur.

Another object of the invention is to provide a metering vessel with a valving arrangement in which a liquid inlet and vent valve and a liquid outlet valve are operated by a common actuator so arranged that the actuator must undergo some movement after it has closed the inlet-vent valve and before it opens the outlet valve thereby assuring that liquid is never flowing into and out of the tank at the same instant.

Another object of the invention is to provide an improved valving arrangement for such type of fluid meter in which the valves are arranged such that the metering vessel always will be completely filled with liquid to the complete displacement of all previous gas contents and, when emptying, will be drained to a satisfactorily high degree of completeness.

Another object is to provide a valving arrangement for such type of meter in which the valves when closed conform substantially to the curvature or profile of adjacent portions of the vessel so that the volumetric capacity of the vessel is not substantially changed by the installation of such valves and so that pockets or irregularities in contour do not occur adjacent to or at the valves such as would interfere with accurate sampling or accurate metering.

Another object is to provide a valving arrangement for a metering vessel in which the liquid inlet valve is closed before the displaced gas outlet or vent valve is closed thus insuring that virtually all dynamic effects are terminated and that a known pressure for the metered liquid is established before the closing of the vent valve establishes the measure of the metered liquid volume.

Another object is to provide a metering apparatus in which the closing of the liquid outlet valve and the opening of the liquid inlet valve is responsive to the velocity of liquid flow through the outlet falling to substantially zero whereby closing and opening of such valves is positively controlled and emptying of the metering vessel is assured.

Another object is to provide an improved system for controlling a metering and/or sampling apparatus of the above type in which the elements of the control system are so interlocked that the only sequence of operations of the metering and/or sampling apparatus which can occur is the desired one.

Another object is to provide an improved shuttle or pilot means particularly suited for use in such a control system, in which an element is moved from one position to another by an actuating medium and yet in which the element can be returned to its original position before the force exerted by the actuating medium is reduced or removed.

Another object is to provide an actuator in which an actuating element is moved by the application of fluid pressure and in which, upon completion of the desired movement of the actuating element, it returns to its original position even though the pressure applied to the actuator has not yet been reduced or removed.

Another object is to provide a metering or a metering-sampling apparatus which can receive fluid to be metered, or sampled, from a relatively low pressure source and then discharge such fluid into a relatively high pressure receiver therefor, the arrangement functioning automatically in a desired sequence of operation such as to positively prevent the application of such relatively high pressure to the fluid source.

Another object is to provide an improved system for controlling a metering and/or sampling apparatus in which the application of an elevated pressure to a batch type metering vessel to cause it to also function as a displacement pump is so integrated with the operation of the metering and/or sampling mechanism that such pressure is positively prevented from being applied to the relatively low pressure source of fluid to be metered and yet is applied to the vessel in a manner to assure complete emptying thereof during each cycle of operation.

Other obects, advantages and features of this invention will be more apparent to one skilled in the art upon consideration of the written specification, the appended claims and attached drawings wherein:

FIG. 1 is a somewhat schematic vertical section of a sampling apparatus embodying this invention;

FIG. 2 is a cross-sectional view taken on line 2—2 of FIG. 1;

FIG. 3 is an isometric view illustrating another embodiment of sampling apparatus;

FIG. 4 is a cross-sectional view taken on a line 4—4 of FIG .3;

Figure 5:
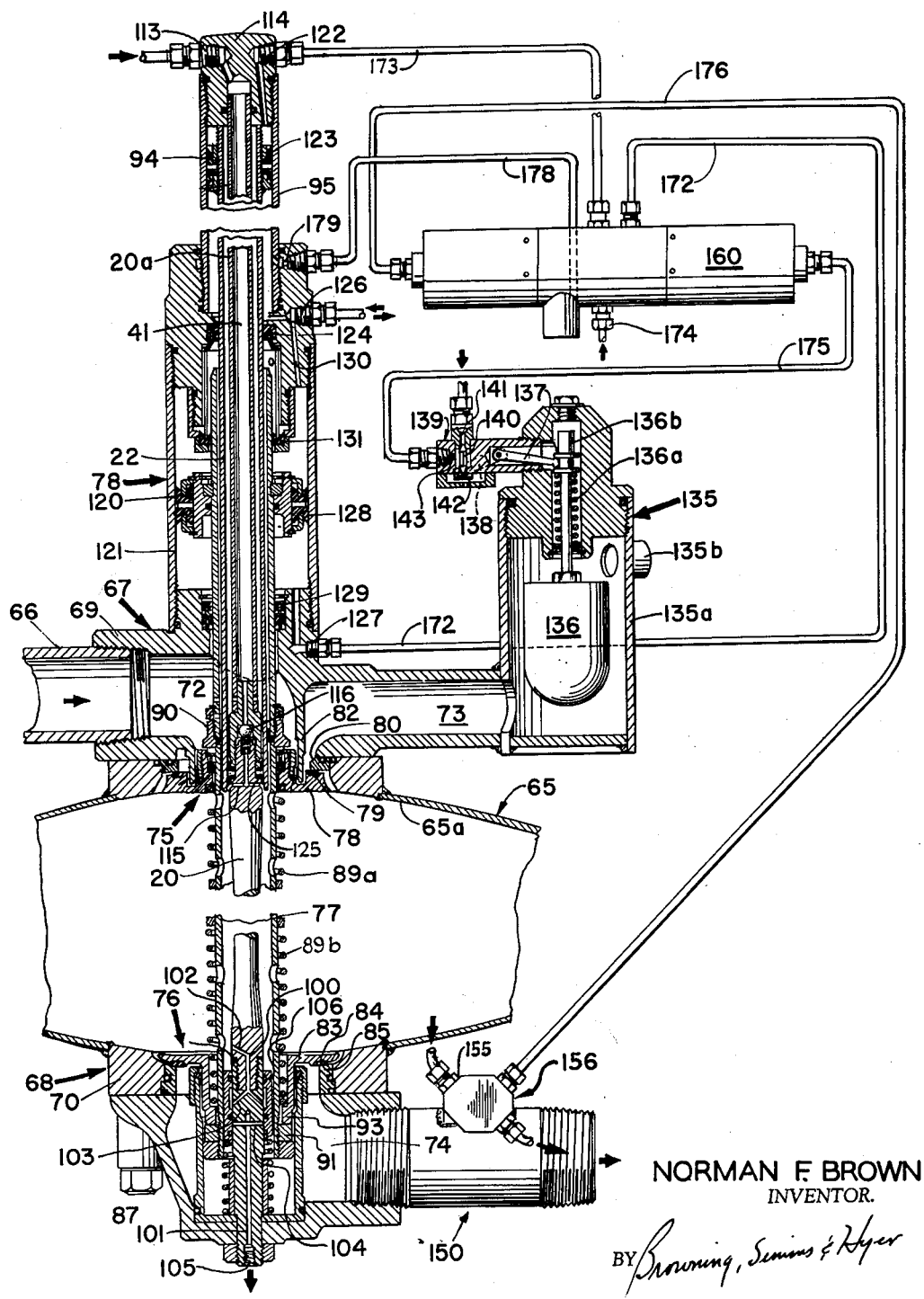
FIG. 5 is a vertical cross-sectional view of a preferred embodiment of the sampling-metering apparatus of this invention including the control system therefor and illustrating the apparatus installed on a metering vessel.
Figure 7:
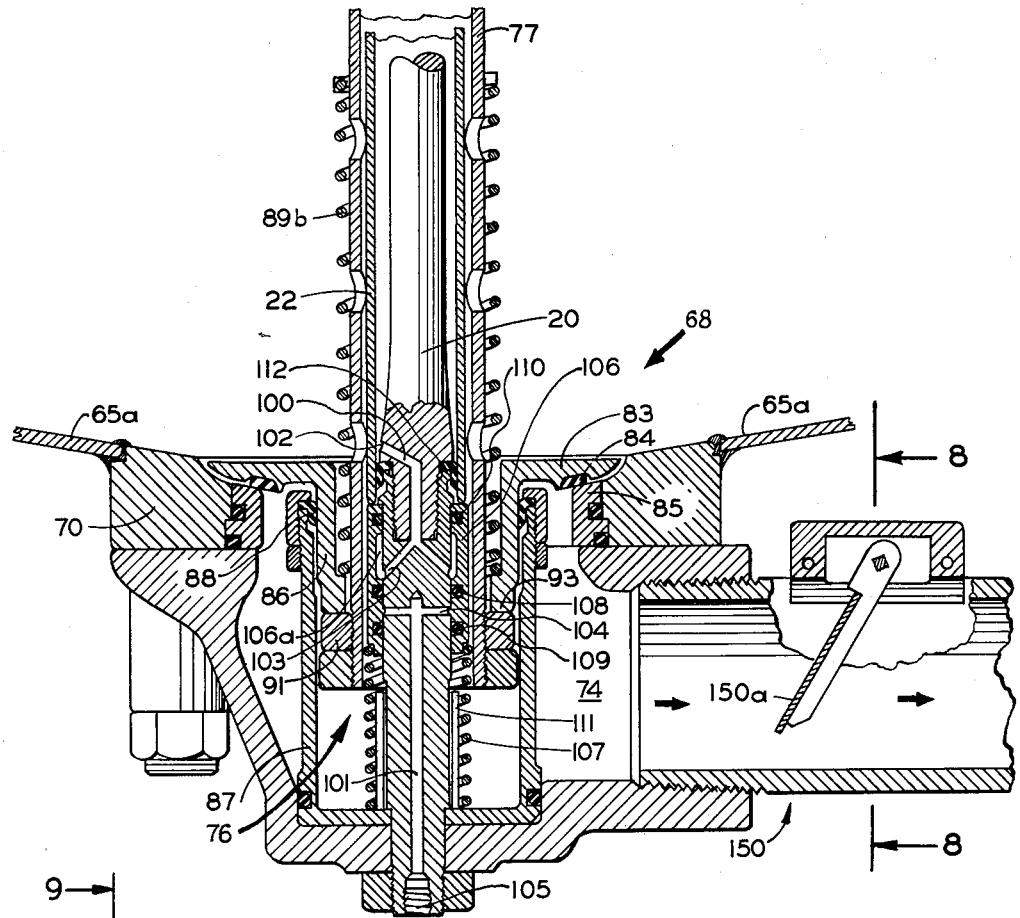
FIG. 7 is an enlarged view of the liquid outlet valving arrangement of FIG. 5 with its associated liquid velocity sensitive control.
Figure 8:
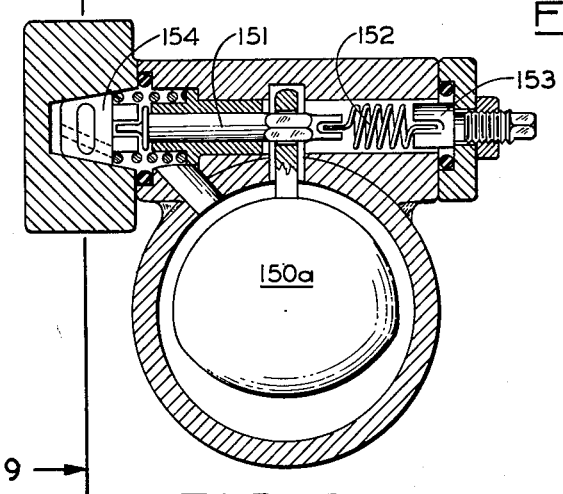
Figure 9:
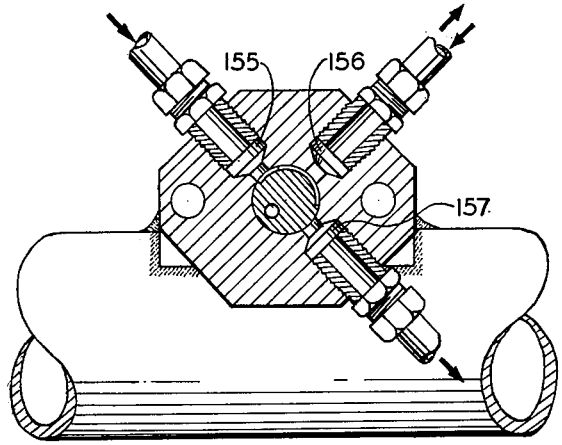
Figure 10:
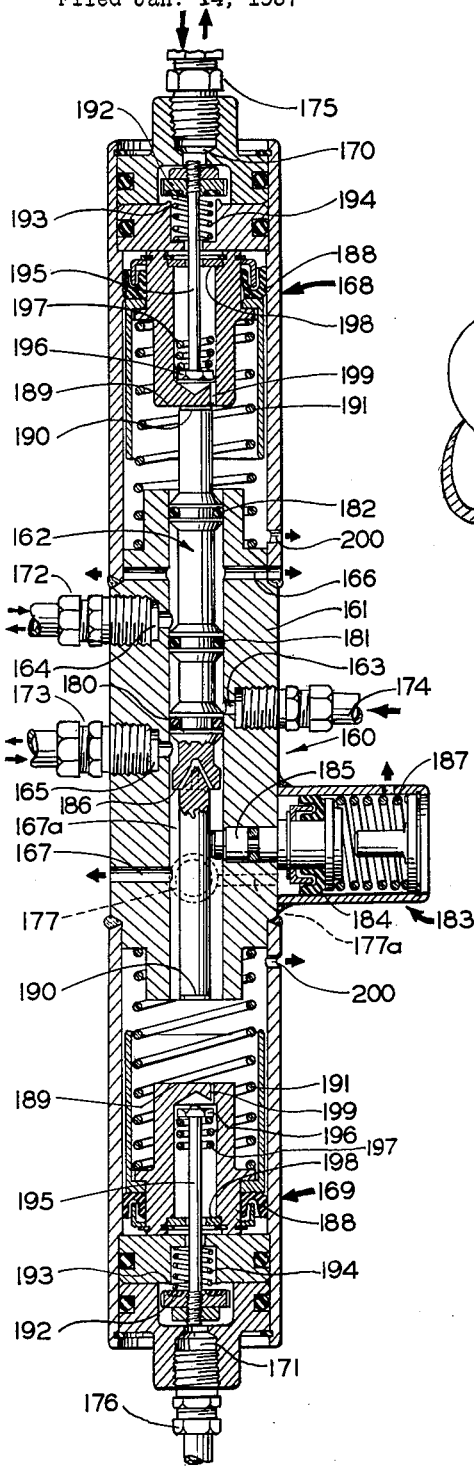
Figure 11:
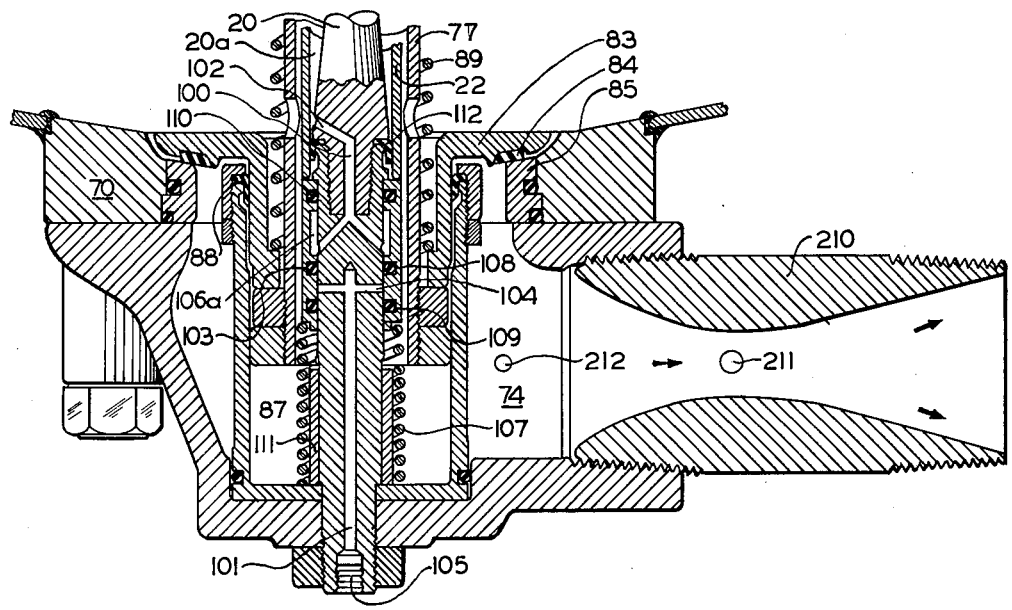
Figure 12:
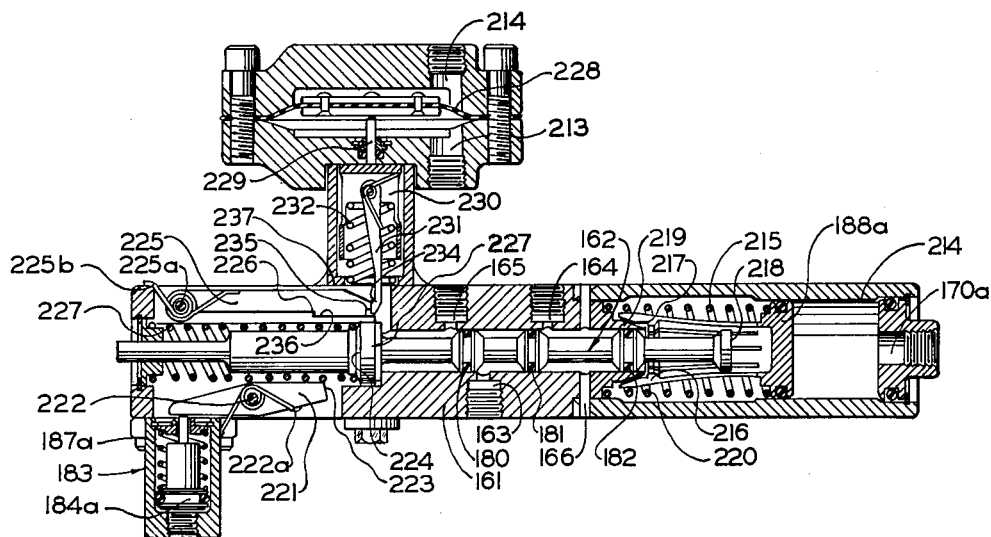
Figure 13:
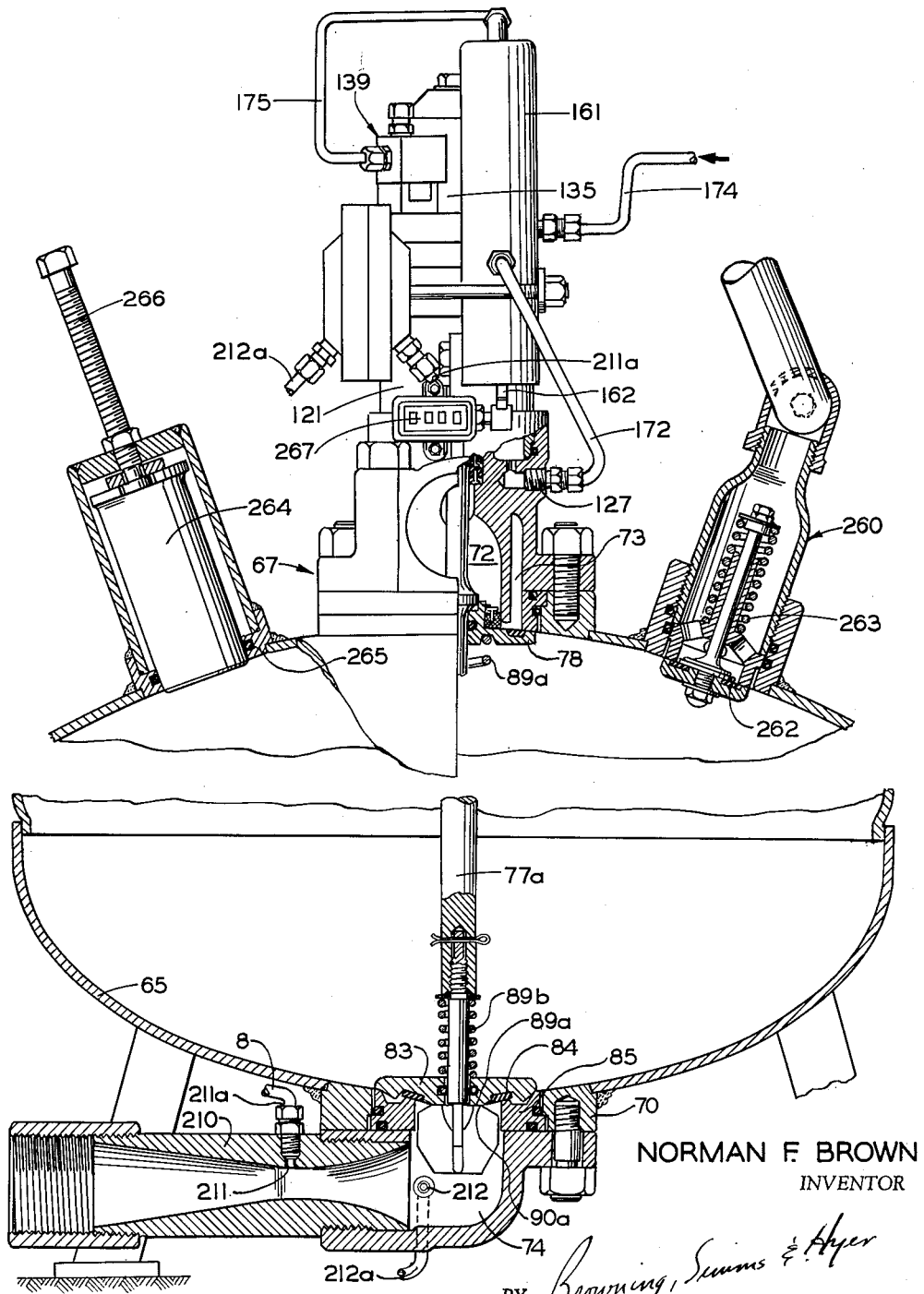
Figure 14:
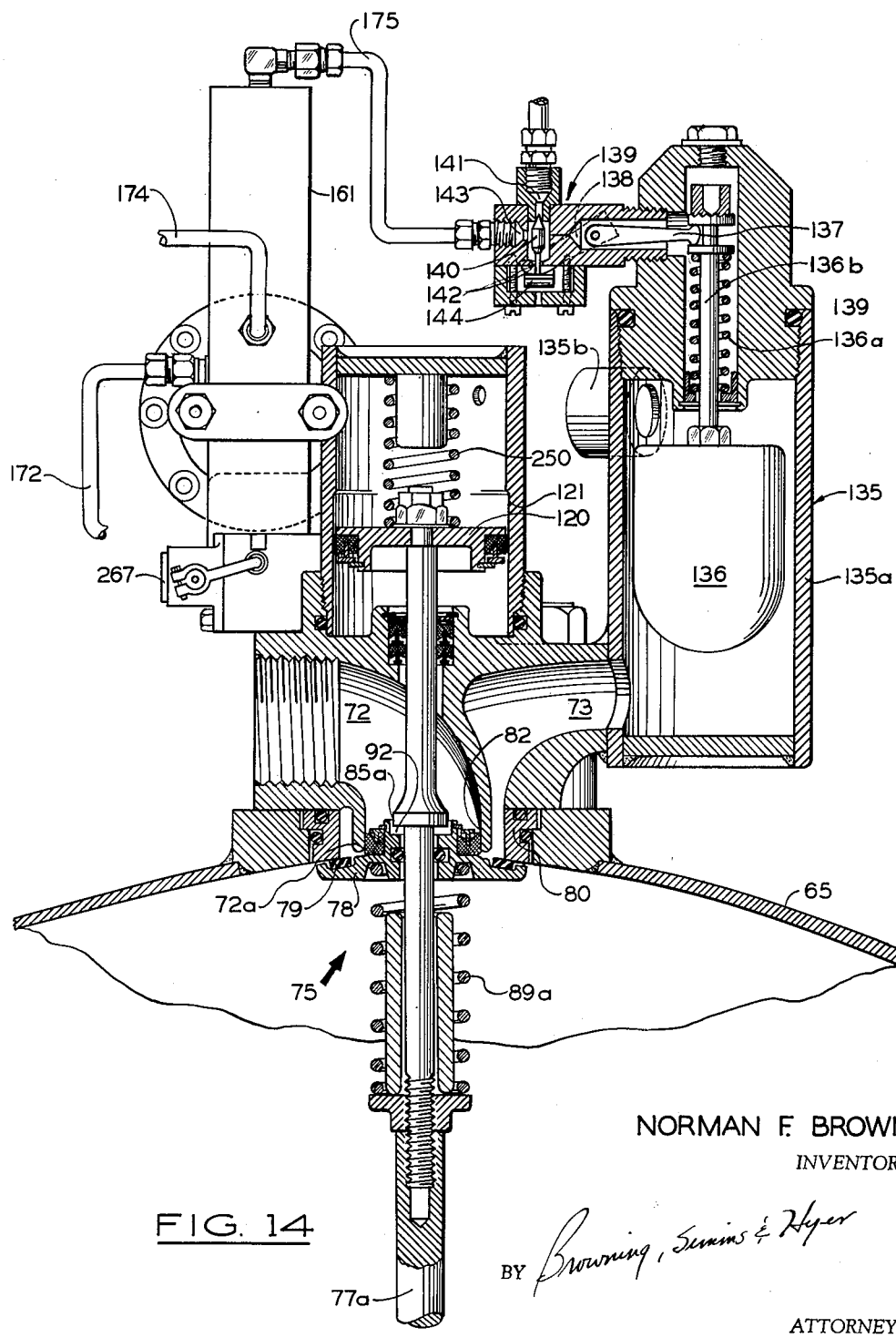
Figure 15:
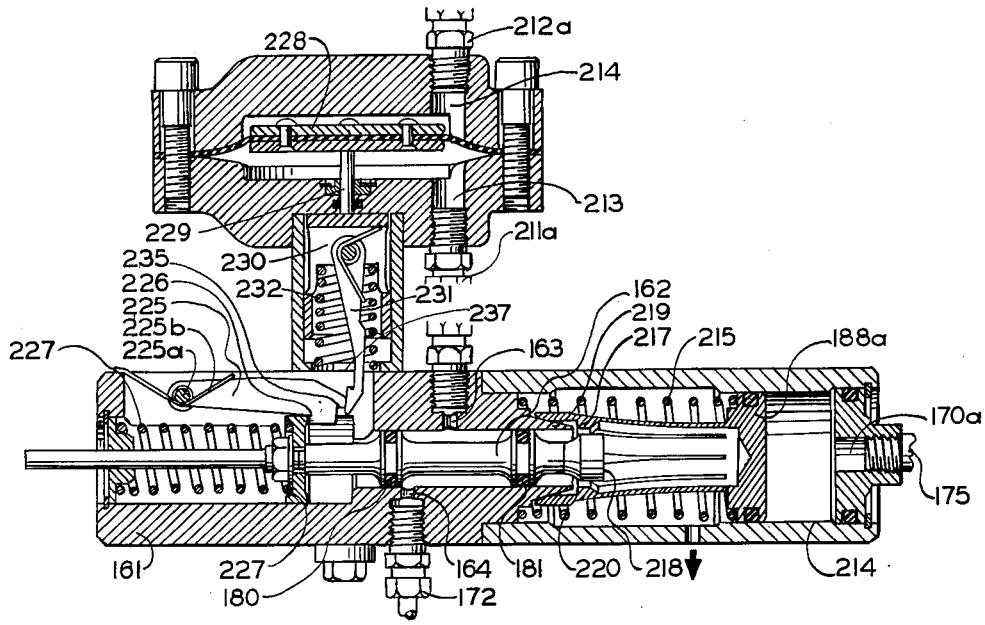
Figure 16:
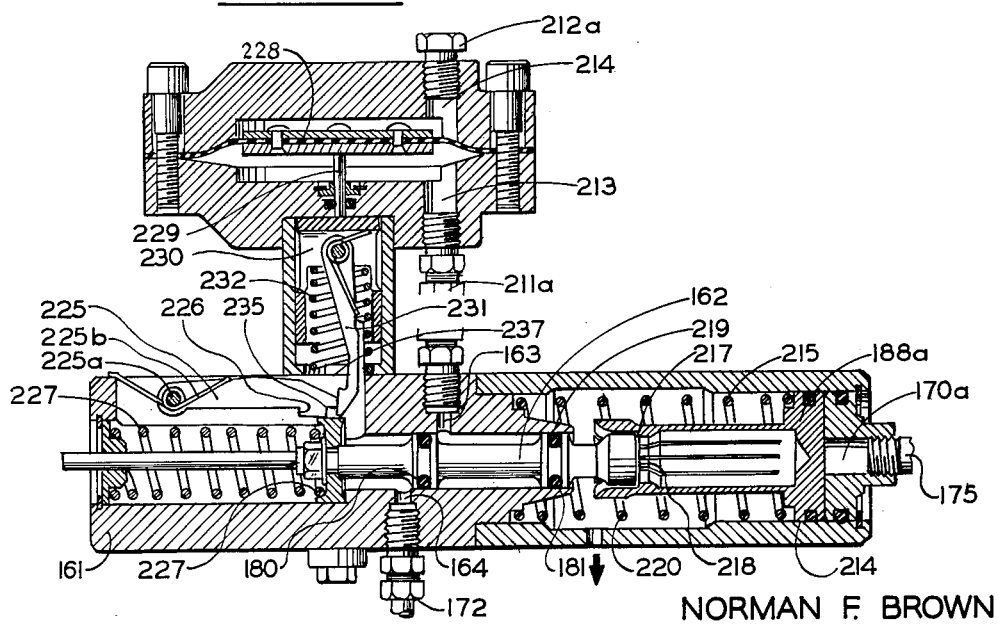
Figure 17:
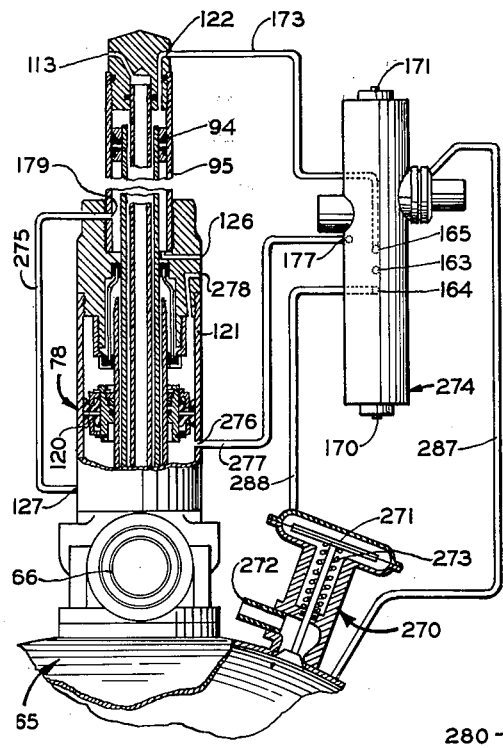
Figure 18:
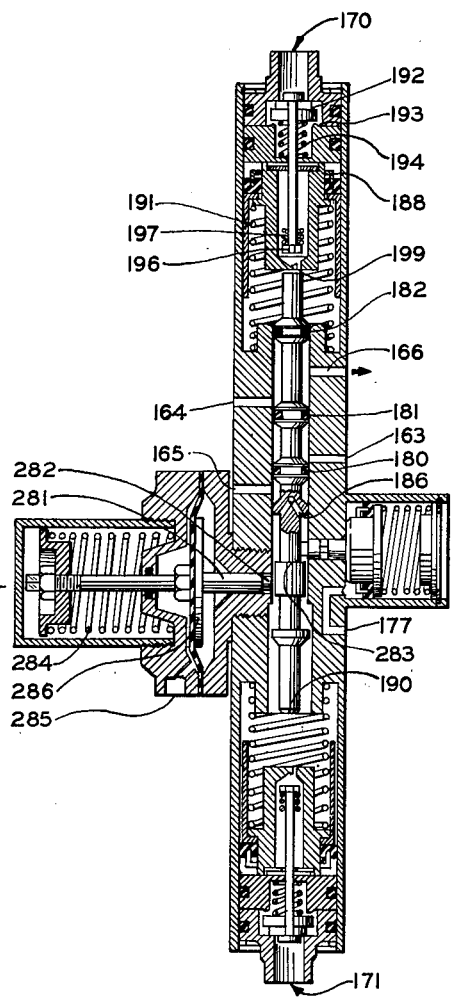

FIGS. 8 and 9 are views taken on lines 8—8 and 9—9 of FIGS. 7 and 8;

FIG. 10 illustrates a preferred form of a novel shuttle or pilot valve especially adapted for use as part of the control system illustrated in FIG. 5 and it also illustrates the actuator mechanism of this invention;

FIG. 11 shows a modified form of the liquid outlet control apparatus employing a venturi in place of the moveable paddle-pilot valve arrangement of FIGS. 7 to 9;

FIG. 12 is another form of shuttle or pilot valve especially adapted for use with the venturi arrangement of FIG. 11;

FIG. 13 is a vertical view, partially in section and partially in elevation, showing another form of the metering apparatus of this invention;

FIG. 14 is an enlarged view of the upper portion of the apparatus shown in FIG. 13;

FIG. 15 is a view of a pilot or shuttle valve particularly adapted for use with the fluid meter of FIG. 13;

FIG. 16 is similar to FIG. 15 except showing the valve in another operating position;

FIG. 17 is a partially schematic view similar to FIG. 5 illustrating a preferred form of the meter and sampler of this invention which is also constructed to act as a displacement pump; and FIG. 18 is a view of a pilot or shuttle valve particularly adapted for use with the arrangement of FIG. 17.

Like characters of reference are used throughout the several views to designate like parts.

The concept involved in the sampling apparatus of this invention involves providing a sample receiving space between a fluid displacing core and a reciprocal sample tube in such a manner that the volume of such space varies along the length of the core in the same manner as the volume of the liquid to be sampled varies per increment of depth thereof along the length of the core. Stated in another manner, the core is profiled so that its fluid displacing volume is less than the internal volume of the corresponding length of the tube with the difference in volume varying along the length of the core so that the ratio of such difference for each increment of core length to the volume of the liquid exteriorly of the tube and which is to be sampled and lying between two parallel planes which also bound such increment, is constant for all levels in the vessel. This concept can perhaps best be explained by referring to FIG. 1, wherein a core 20 is shown fixedly extending across the vertical diameter of a vessel, such as pipeline 21. A sample tube 22 is mounted for reciprocation over core 20. The core is contoured or profiled in such a manner that the ratio of the cross-section area S of the sample space to the cross-sectional area V of the vessel, both measured at the same level, is constant at all levels in the vessel. Thus if S is 1% of V at the level shown in FIG. 1, then area C is also made to be 1% of area D and so on throughout the depth to be sampled.

This relationship can be expressed mathematically by the formula $$\frac{ds}{dl}=K\frac{dv}{dl}$$

wherein $s$ is the volume of the sample space, i.e. the difference in volume between the internal volume of the sampling tube and the fluid displacing volume of the core, $v$ is the volume of the vessel exteriorly of the sample tube, $l$ is the level under consideration along the length of the core and $K$ is a constant. Specifically applying this formula, two imaginary planes E and F are shown in FIG 1 extending across the vessel perpendicularly to the vertical axis of core 20. If $ds$ is the volume in the annulus between the core and tube between these two planes and $dv$ is the volume between the planes exteriorly of the tube, the ratio of $ds$ to $dv$ must remain constant for all positions of planes E and F in the vessel in order that a representative sample will be obtained. With such an arrangement, it can be seen that by reciprocating tube 22, a volume of sample will be trapped between the core and tube which is truly representative of the liquids in the vessel.

In the discussion above, reference is made to the volumes, cross-sectional areas, etc. of a vessel illustrated in FIG. 1 as a pipeline. In the sampling of a pipeline through which liquid is continuously flowing the frequency of sampling should be proportional to the flow rate through the pipeline in order to obtain a truly representative sample. Therefore, for the purposes of the above discussion, the "volume" of the pipeline can be considered to be the volume of fluid which flows through the pipeline during the time interval between successive samplings (e.g. gallons per minute flow divided by time between samples in minutes). In essence, then, the pipeline is considered to be a flat-ended section of pipe having a volume as above defined.

For pipeline sampling, a simpler approach is to consider V and D, FIG. 1, as chords across the pipeline.

Then the concept of the invention, as applied to pipelines having continuously flowing liquid therein, involves the provision, between a vertical core and the inside of a tube reciprocating over the core, of a sample receiving space whose horizontal cross-sectional areas, at all heights on the core, bear the same constant relationship to the horizontal chords across the pipe, at the same heights. Thus the ratio of area S to chord V is the same as that of area C to chord D in FIG. 1.

The term "vessel" as used in this specification and claims is meant to include all vessels of non-rectangular cross-section including a pipe or pipeline. By "non-rectangular cross-section" it is means that the walls of the vessel are not all perpendicular to and parallel to the longitudinal axis of the sample core. Also when language in the specification and claims refers to the volume or cross-sectional area of a vessel, such as that exteriorly of the sampling tube, and when such language is applied to a pipeline of long length, it will be understood as referring to a selected length of the pipeline such as that above discussed.

The sampling tube is provided with means for reciprocating the same and for discharging the sample after it has been isolated from the remaining contents of the vessel. Such means are illustrated in FIG. 1 to include a cylinder 23 mounted on pipeline 21 and a piston 24 reciprocally mounted in the cylinder and connected to the sampling tube to reciprocate the same. Sliding seals 25 and 26 can be provided so that actuating medium introduced into space 27 through pipe 28 acts upon the piston to move the sample tube downwardly to sample isolating position as illustrated in FIG. 1. The actuating medium, such as gas, is here shown to be under the control of a timing mechanism including a timing wheel 29 having timing pins 30 thereon. As the wheel rotates, one of pins 30 engages cam 31 of lever 32 to pivot the lever clockwise against spring 33. This pivoting of the lever permits valve element 34 of three-way valve 35 to move downwardly and seat at 36 to close vent 37. The actuating medium from pipe 38 can then flow through inlet port 39 to pipe 28 to force the sampling tube downwardly. Then upon further rotation of wheel 29, the pin which pivoted lever 32 will become disengaged therefrom allowing spring 33 to pivot the lever so that valve element 34 is raised to seat and interrupt flow through inlet 39 and at the same time to open vent 37 whereby space 27 in cylinder 23 is returned to atmospheric pressure. To retract the sample tube, pressure fluid is supplied via pipe 40 to flow through bore 41 of core extension 20a and finally into space 42 below piston head 24. The actuating fluid for retracting the sample sleeve can be supplied intermittently and alternately with the supply of fluid through pipe 28 or, more preferably, can be constantly supplied at a pressure substantially less than that supplied through pipe 28 so that it acts as a resilient means urging the sample tube toward retracted position.

Valve means are provided for discharging the sample from the apparatus after it has been isolated by the sample tube. Preferably the valve means is opened to discharge the sample by continued movement of the sample tube after it has perfected a seal to isolate the sample from the remainder of the liquid in the vessel. Such means are here illustrated as including an annular valve member 43 having a resilient face 44 arranged to seat against the annular seat 45 of the sample core and also with the nose 46 of the sample tube. A resilient means such as spring 47 is provided to urge valve member 43 constantly toward seated position with one or the other of the tube and core. A sample discharge passage 48 communicates between the exterior of the apparatus and a point intermediate face 44 and seal 49. With this arrangement, it will be seen that prior to the sample tube contacting face 44, the latter is pressed against seat 45 by spring 47 assisted by pipeline or vessel pressure acting on the annular area between seat 45 and seal 49 so that passage 48 is isolated from the pipeline. However, upon the sample tube moving downwardly, its nose 46 forms a seal with face 44 and further downward movement of the sample tube moves valve member 43 downwardly to unseat face 44 from seat 45 so that the sample can be discharged. As a result, discharge passage 48 is always sealed from communication with the interior of pipeline 21 and is open to discharge a sample only after the sample tube has isolated the sample by seating its nose 46 on face 44 and thereafter moving a further distance downwardly.

To aid in discharging the sample, means are provided for admitting pressure fluid to the sample space after the sample tube has moved to sample isolating position and opened the sample discharge valve. Such means can take several forms but is shown here as a valve comprising an enlarged bore 50 situated in the sample tube so that after the tube seats its nose on valve 43 and with some further over-travel, seal 52 will be within enlarged bore 50 so that gas from pipe 40 and bore 41 can flow into the sample receiving space between the core and tube to pressure the sample into a sample receiver. This permits the sample receiver (not shown) to be maintained, if desired, under a superatmospheric pressure. Also, it will be seen that the arrangement is such that the pressure interiorly of pipeline 21 is never applied to the sample receiver. Also, the pipeline can be at a pressure less than that of the sample receiver and yet the sample will be properly discharged.

Profiling of the sample core can be achieved in numerous ways. In FIG. 1, the core is profiled by varying diameter. In FIG. 3, substantially the same result is accomplished by forming a groove 60 in sample core 20b. The depth of the groove is varied along the length of the sample core so that the cross-sectional area of the groove at any position along the length of the core varies in the same manner as does the chord length across the pipe perpendicular to the core axis at the same relative position. The groove in FIG. 3 is shown as having parallel side walls 60a and 60b and the depth of the groove is varied in accordance with the curvature of the pipe walls. Of course, it will be understood that the groove can be of any desired cross-sectional configuration as long as its cross-sectional area varies as discussed above.

Referring now to FIGS. 5 to 10, there is shown a preferred embodiment of a metering and sampling apparatus which not only embodies the above discussed concept of sampling, but also improvements in batch metering apparatus. Stated briefly, the arrangement illustrated involves a metering vessel 65 having upper and lower valve and flow directing assemblies 67 and 68, the valves of which are both opened and closed by motor 78. Fluid to be metered flows into the vessel through the open upper valve, the lower valve being closed, until it overflows into liquid level sensing device 135. This device then sends a signal to shuttle or pilot means 160 and the latter in turn causes a motor, such as that shown to include piston 94, to be actuated. Such actuation causes sample tube 22 to telescope over sample core 20 to isolate a sample which is eventually discharged. When the sample tube motor has moved the sample tube far enough to isolate the sample, it causes a signal to be sent to pilot means 160. As a result, motor 78 opens the lower valve after it has closed the upper valve. The resulting flow of liquid from the outlet acts on a velocity sensing device 150 so that when such flow ceases, a signal is sent to pilot means 160 whereby the sample tube is retracted and motor 78 is actuated to close the lower valve and thereafter to open the upper valve. The cycle of operation is then repeated.

The foregoing arrangement is such that the valves controlling the inlet and outlet, as well as a vent for gas displaced by the liquid being metered, are operated by a single actuator so that the desired sequence of opening and closing will always be adhered to and so that at least one valve will be closed at all times to prevent liquid from flowing into and out of the vessel at the same instant. The various valves are preferably arranged in the vessel so that it is completely filled and emptied of liquid during each cycle of operation and also so that the valves coincide with the normal contour of the vessel to increase the ease and accuracy of both the metering and the sampling. The arrangement also involves a novel control system for effecting the desired sequence of operation in which a shuttle or pilot mechanism controlling the sampling and filling and emptying operations cannot start the emptying operation until it receives a signal that the sampling operation has been substantially completed (i.e. the sample isolated) whereby no liquid can be drained from the metering vessel until the sample has been isolated thereby assuring a representative sample of all strata of liquid in the vessel. Other features, some of an importance at least equal that of those features just mentioned, will be more specifically referred to below.

Figure 6:
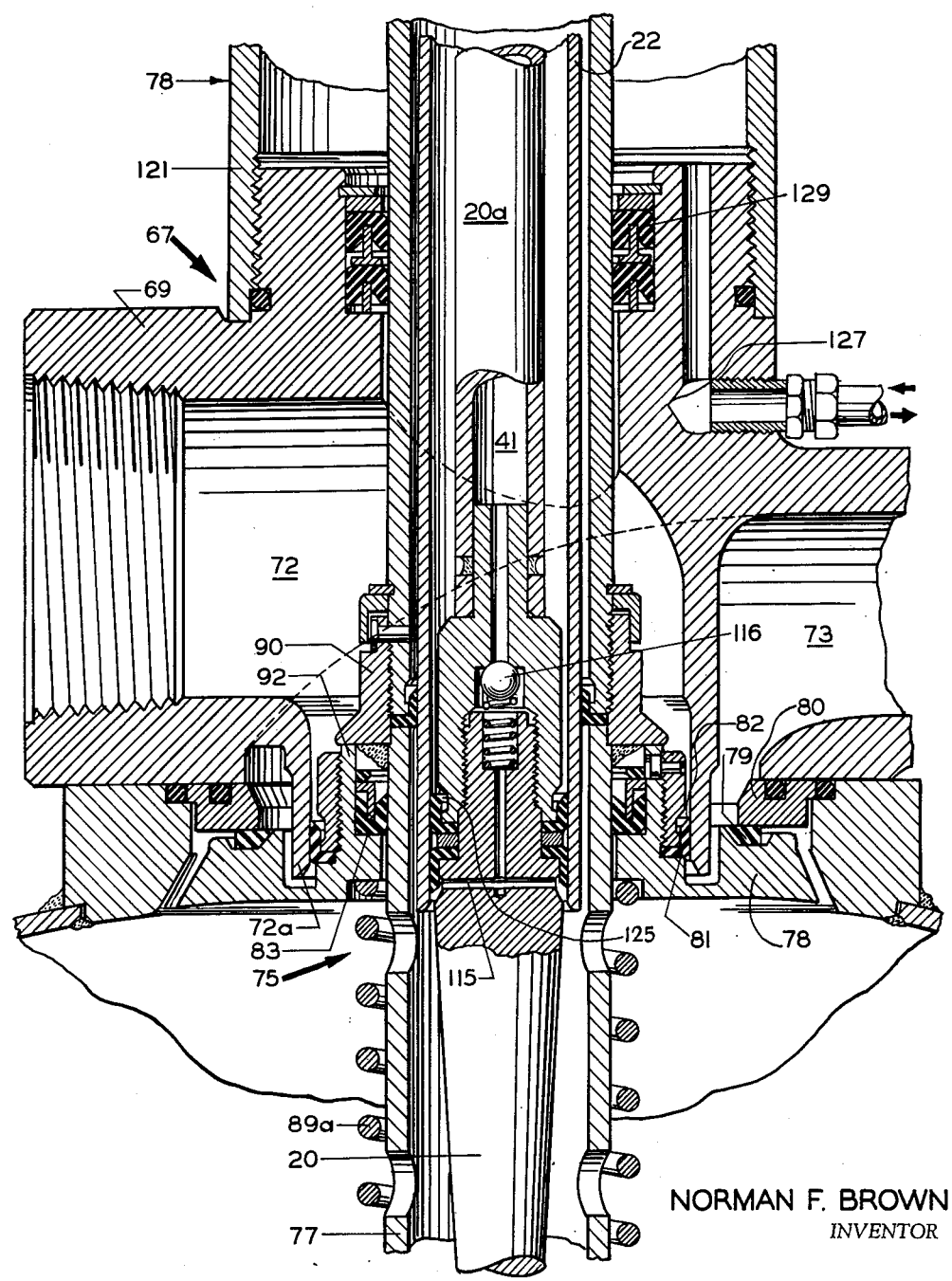
FIG. 6 is an enlarged view of the liquid inlet and vent valving arrangement shown in FIG. 5.

Thus referring to FIGS. 5, 6 and 7 in particular, metering vessel 65 receives liquid to be metered from inlet pipe 66.

It has housings 69 and 70 mounted thereon with housing 69 having a liquid inlet 72 concentric with a displaced gas and liquid overflow passage or vent 73 while housing 70 contains liquid outlet 74. Flow through the inlet and vent and through the outlet are controlled by upper and lower valve assemblies designated generally as 75 and 76. These valve assemblies are inter-connected by a stem 77 which is moved by motor means 78. The inter-connection of the valve assemblies and the stem is such that upon upward movement of the stem, upper assembly 75 is closed before lower assembly 76 is opened and upon downward movement of the stem, lower assembly 76 is closed before upper assembly 75 is opened. In this manner, it is not possible for liquid to flow into and out of the vessel at the same instant.

Turning now to a detailed discussion of the construction, the upper valve assembly includes an upper valve member 78 here shown to be a unitary structure of the disc-type and incorporating a resilient sealing element 79 adapted to seat against seat 80 to control flow through vent 73. Flow through liquid inlet 72 is controlled by a sliding seal 81 which fits into or seats in a bore 82 extending from terminus 72a of the liquid inlet. For the purpose of the specification and claims, the terms "seat" or "valve seat" and the like are to be construed to be broad enough to cover a bore-sliding seal arrangement such as that just described as well as more conventional seating arrangements typified by seal 79 and seat 80.

The inlet terminus 72a is preferably situated at a lower level in the vessel than is the seating surface of seat 80 surrounding the vent inlet. This assures that substantially all gas in vessel 65 will be displaced by liquid so that the vessel will be liquid full before it is emptied. Also, it will be noted that the positions of seat seals 79 and 81, relative to seat 80 and the point in bore 82 at which seal 81 first forms a seal is such that seal 81 will seat in bore 82 to stop liquid in-flow before seal 79 seats with seat 80 to close the vent. With such construction, the liquid inlet valve must necessarily be closed before the gas outlet or vent valve is closed, thus insuring that virtually all dynamic effects are terminated and that a known pressure for the metered fluid is established before the closing of the gas outlet valve establishes the boundary and measure of the metered volume.

The lower valve assembly includes an annular valve member 83 of the disc-type having a seating seal 84 adapted to seat upon seat ring 85 surrounding the liquid outlet.

The upper valve member 78 is maintained in proper alignment with its valve seats by virtue of its having a sufficiently snug sliding fit on valve stem 77 to achieve that purpose. While lower valve member 83 could have a similar arrangement, it is shown as having a depending skirt 86 sliding in a cylindrical guide and closure member 87. Seal 88 acts to prevent by-passing of fluid to outlet 74 around the upper end of member 87. It will be noted that since the interior of member 87 is at the same pressure as vessel 65 when the lower valve is closed, such pressure tends to hold the valve closed by acting over the annular area between seal 88 and the seal formed by 84 with seat 85. The effective area in this case is less than it would be if valve member 84 were sealed to stem 77 and therefore less force is required to open the lower valve.

As indicated above, both valve members 78 and 83 are interconnected by stem 77 so that both can be actuated by a single controlled actuating mechanism. In this respect, it is preferred that the valve members be positioned to be moved to unseated position by respective movement of each in opposite directions, e.g. here shown to be toward each other. To facilitate their manipulation, they can be arranged for much movement along a common axis, that is, the valve discs are coaxial as are the inlet, vent and outlet they control. A less desirable arrangement would be to form the upper valve member in two portions lying to either side of the stem with the inlet and vent being similarly situated.

As shown, stem 77 has a limited sliding connection with each valve member which is urged toward its seated position by suitable resilient means such as springs 89a and 89b, respectively. To unseat the valve members, stem 77 has nuts 90 and 91 respectively engageable with ends 92 and 93 of the valve members. The spacing between nuts 90 and 91 is made somewhat greater than the spacing between valve member ends 92 and 93 when the valve members are seated. Accordingly, stem 77 must "over-travel" by this difference in spacing before it can unseat one valve member after permitting the other to seat. This positively provides that both valve members cannot be held by the stem in unseated position at the same time.

Valve seals 79, 81 and 83 and the elements against which they seat are preferably arranged so that when seated, valve member 78 substantially conforms to the curvature of the surrounding vessel portions 65a. This construction renders the internal contour of the vessel, when the valves are closed, virtually continuous whereby (1) its volume can be more easily and accurately determined and (2) the profiling of the core is rendered simpler and more accurate since it does not have to account for any irregularities in the calibration of the vessel.

The metering apparatus of FIG. 5 has combined therewith an embodiment of the sampling apparatus described above. Thus core 20 and sampling tube 22 are shown disposed coaxially with the upper and lower valve members 78 and 83. The sample tube is connected to a motor means here illustrated as a piston 94 which is mounted for reciprocation in a cylinder 95 and connected to the sampling tube.

A sample discharge means is provided which differs somewhat from that described in respect of FIG. 1 although the principle of operation is the same. Thus the sample discharge passage is divided into two portions, i.e. passageways 100 and 101. Passageway 100 has an inlet 102 communicating with the sample receiving space between the tube and core and an outlet 103 at the periphery of the core. Passageway 101 has an inlet 104 also at the periphery of the core but spaced from outlet 103. Its outlet is at 105 exteriorly of the metering vessel. Flow between passageways 100 and 101 is controlled by a sleeve valve 106 which is reciprocally mounted on the lower end of the sample core. It is urged to seated or closed position by spring 107 and has spaced seals 108, 109 and 110 which, with sleeve valve 106 in closed position, prevent flow through passageways 100 and 101. A sample isolating seal 112 is carried by one of the sample tube or core to form a seal therebetween after the sample tube has been telescoped over the core to sample isolating position as shown in FIG. 7. Thus, as the sample tube moves down, it first isolates the sample by engaging seal 112 and then it moves sleeve valve 106 downwardly to space seals 110 and 108 above outlet 103 and below inlet 104, respectively. The sample can then flow from the sample space through passageway 100, annulus 106a, and passageway 101 into a sample receiver. Upon retraction of the sample tube, spring 107 returns the sleeve valve to its FIG. 7 position to again interrupt flow through the passageways 100 and 101. With this construction, it can be seen that passageway 100 by-passes seal 112 and flow through such by-pass to the sample discharge outlet 105 is controlled by the sleeve valve responsive to movement of the sample tube.

To aid in discharging the sample, the sample core is again provided with an extension 20a having a bore 41 communicating with a fluid inlet port 113 in head piece 114. The lower end of bore 41 opens into the space between the sample tube and core via ports 115 but flow through the bore is controlled by a pressure differential operated valve such as spring loaded check valve 116. The check valve is normally held closed by the difference in pressure between the metering vessel and the lower pressure applied through port 113 and bore 41, as well as the force exerted thereon by its spring. When the pressure in the sample receiving space is reduced to a value below that in vessel 65 (usually to about atmospheric) by virtue of the sample tube opening sleeve valve 106, the pressure from inlet 113 overcomes the spring force holding check valve 116 closed and gas is admitted to the sample space to aid in discharging the sample. Upon retraction of the sample tube, the check valve is again exposed to the pressure in the metering vessel to cause it to be maintained in seated position.

The motor means for reciprocating sample tube 22 and the valve stem 77 includes piston 94 as above described and, as here illustrated, a second piston 120 fixed to valve stem 77 and reciprocally mounted in cylinder 121. Head piece 114 is provided with another fluid inlet port 122 through which pressure fluid can be supplied to act on the upper end of the sample tube piston 94 over an area comprising the annular area defined by seals 123, 124 and 125. This moves the sample tube downwardly. Upward movement of the sample tube is effected by reducing the pressure on the upper side of piston 94 so that a pressure fluid which is constantly applied through port 126, can effectively act against the lower side of piston 94 to retract sample tube. Similarly, pressure can be applied through port 127 to act against the lower side of piston 120 over an area defined by seals 128 and 129 to move the piston and valve stem upwardly to seat upper valve member 78 and to unseat lower valve member 83. Movement of the valve stem in an opposite direction is effected by reducing the pressure applied through port 127 and permitting pressure fluid from port 126 to act through passage 130 on the upper side of piston 120 over an area equal to the annular area between seals 128 and 131.

From the foregoing it can be seen that by increasing and decreasing the pressure acting on the upper side of piston 94 and on the lower side of piston 120, these pistons can be reciprocated, the constantly acting pressure on the other sides of these pistons acting as a resilient means which is overcome to move the pistons in one direction and which applies the effective driving force to move them in the opposite direction. If desired, springs can replace the constantly acting pressure but such will make the piston operation more difficult due to the loading rate of the springs. Also, pressures can be alternately applied to the opposite sides of the pistons to move the same but such complicates the valving of the control system.

While the piston-cylinder type of motor means is preferred, particularly in the arrangement shown, other types of motor means can be utilized such as rotary motors, etc.

An improved control system is provided to positively control the sequence of operation of the sample tube and of the inlet and outlet valves. In general, this control system includes a motor means, such as that above described, for actuating the sampling device and flow valves, liquid sensing means arranged to send a signal each time the meter vessel becomes full and empty and control means connected to the liquid sensing means to receive the "full" and "empty" signals therefrom and in response to such signals, properly actuate the motor means. In a preferred form, the control means also prevents the motor means from opening the liquid outlet valve until the control means receives a signal that the sampling has been completed.

The liquid sensing means for sending a signal responsive to the metering vessel becoming liquid full is here illustrated as including a float chamber 135a connected to vent 73 and having a float 136 positioned at a level above the upper-most part of the vessel. The float operates through arms 137 and 138 to control the operation of pilot valve 139. This pilot valve includes a valve element 140 movable upwardly to close off pressure inlet port 141 and at the same time to open vent 142 to port 143 by a flat blade spring 144 best shown in FIG. 14. This spring is permitted to function so when float 136 moves downwardly, it swings arm 137 and lifts arm 138 away from contact with spring blade 144. However, upon vessel 65 becoming full of liquid so that liquid overflows via vent 73 into the float chamber upward movement of the float causes arm 138 to press downwardly on spring blade 144 allowing valve element 140 to close vent 142 and open port 141 so that pressure fluid can flow to port 143. Thus, pilot valve 139 permits pressure fluid to flow to port 143 upon a rise in liquid level in chamber 135a and vents port 143 upon a fall in liquid level. This exterior float arrangement eliminates any need for very accurate liquid level determination in order to obtain accurate metering of liquid. As will be seen, liquid flows into the float chamber only after the metering vessel has become filled and will be trapped in the chamber during the time the vessel is emptying due to the fact that upper valve closes responsive to float 136 rising and does not reopen until after the vessel has been emptied and the lower valve closed. Accordingly, variation in the volume (level) of liquid in the float chamber does not affect the accuracy of the meter.

A gas outlet 135b can open into the float chamber to conduct away the gas displaced from the metering vessel by the liquid. The gas outlet can be connected to any suitable device for maintaining a desired pressure in the vessel during filling thereof.

It may here be noted that float 136 can be a solid piece of metal (or other material) such as aluminium. By sizing spring 136a so that it supports the weight of the float (including that of stem 136b) less a fraction (e.g. one-half) of the weight of the liquid the float will displace, the solid float will then function in the manner of a conventional hollow float.

The means for sending a signal responsive to the metering vessel emptying (i.e. responsive to cessation of liquid flow from the outlet) is preferably of the liquid velocity sensitive type although other types can be used. A preferred means is illustrated in FIGS. 7, 8 and 9 as including a flow responsive part, such as paddle 150a, mounted to swing back and forth so as to oscillate shaft 151. The paddle is urged to its FIG. 7 position by torque spring 152. The torque applied by spring 152 is adjusted by rotation of part 153 to be sufficient that the paddle 150a is in its FIG 7 position when no fluid or only gas is flowing through outlet 74, but with liquid flowing through the outlet, the increased force applied against the paddle overcomes the torque so that the paddle swings to the right of its position shown in FIG. 7. This swinging movement of paddle 150a responsive to the flow or absence of flow of liquid governs the operation of a three-way valve 154. The three-way valve is constructed so that with paddle 150a in its FIG. 7 position, pressure inlet port 155 is connected with transfer port 156 while vent 157 is closed. Upon movement of paddle 150a to the right as when liquid flows through the outlet, transfer port 156 is connected with vent 157 while pressure inlet port 155 is closed. This permits a signal (here removal of pressure) to be sent to the shuttle or pilot means described below responsive to emptying of the metering vessel. It will be noted that the arrangement of FIGS. 7, 8 and 9 is such as minimizes the possibility of paraffin depositions from any crude oil being metered from interfering with the operation of the control system since this oil does not contact any mechanism exteriorly of control mechanism 150 and does not flow through pilot valve 154.

As indicated in FIG. 5, a shuttle or pilot means is provided to control the sequence of operation of the motor driving the sample tube and the inlet and outlet valves of vessel 65 responsive to various signals received thereby. Referring to FIG. 10, there is illustrated a preferred and novel form of pilot valve for this purpose. In general, the pilot valve includes a valve body 161 having a reciprocal valve element 162 disposed therein to control flow between port 163 and ports 164 and 165 and also to communicate these latter two ports with vents 166 and 167. Connected to the valve are actuators 168 and 169 each of which are adapted to move valve element 162 in one direction responsive to fluid pressure applied through ports 170 and 171. Upon completion of the desired movement, the actuators automatically return to their original position even though pressure is still being applied through ports 170 and 171 and act through passage 177a on the piston 184. As will be explained later a pressure of the order of 10 p.s.i. is applied continuously to the underside of piston 184, the outer side being vented to atmosphere. The spring 187 is strong enough to overcome this 10 p.s.i. and hold the detent plunger 185 normally in its inward position but will give way readily to a superior pressure of the order of 20 p.s.i. supplied to it from port 122 after a sample has been taken.

Turning now to a more specific description of the pilot valve, ports 164 and 165 are adapted to be connected by conduits 172 and 173 (FIG. 5) to ports 127 and 122 of the motor means in order to respectively apply pressure fluid to actuate the sample tube and the upper and lower valves. Port 163 can be connected to a suitable source of actuating pressure medium as by conduit 174. Ports 170 and 171 are respectively connected by conduits 175 and 176 to port 143 of pilot valve 139 of the liquid level control and port 156 of the velocity sensitive device shown in FIGS. 7–9. Similarly, port 177 is connected by conduit 178 to a port 179 which is in fluid communication with the interior of cylinder 95 at a point where piston 94 will move past port 179 during the final increment of the piston's downward travel so that the pressure from port 122 can flow through port 179 and conduit 178 to port 177 to release a detent means.

Valve element 162 is provided with spaced sliding seals 180, 181 and 182. The spacing of these seals is such that with the valve element in a first position, as shown in FIG. 10, seals 180 and 181 isolate inlet port 163 from ports 164 and 165 while the latter are respectively in communication with vents 166 and 167. Upon movement of valve element 162 to its second position, seals 180 and 181 are positioned such that flow from port 163 is constrained to be through port 165, port 164 still being in communication with vent 166. In this position, the sample tube piston is energized to move through its sampling stroke. Upon movement of the valve element to a third position, seal 182 isolates port 164 from vent 166 while seal 181 has moved so that flow from port 163 is through port 164, port 165 being isolated from vent 167 and port 163 by seals 180 and 181, respectively. In this position, pressure fluid is applied to move the piston 120 to close the upper valve and open the lower valve while pressure fluid is trapped in the upper portion of the sample tube piston's cylinder to hold the sample tube in its down position.

A releasable detent 183 is mounted on the valve body so that it prevents movement of the valve element from its second to its third position until the detent is released. This assures that motor 78 cannot be actuated to begin emptying the vessel until the sampling device sends a signal to release the detent at a time when the sample has been isolated. The detent can take many forms, but is here illustrated as comprising a piston 184 having a stem 185 whose end is adapted to project into the path of movement of the valve element and abut against shoulder 186, with the valve element in its second position. Piston 184 is biased to detaining position by spring 187 and is moved to releasing position by pressure applied through port 177 and passage 177a.

Each of the actuator means 168 and 169 is here illustrated as being of the same construction so only one will be described. It includes a pressure responsive means in the form of a piston 188 having a portion 189 adapted to abut against or engage end 190 of valve element 162. The piston is biased toward retracted position by suitable resilient means such as spring 191 and is urged toward valve element moving position by pressure applied through a respective one of ports 170 and 171. This application of pressure is under the control of a trip valve means comprising valve element 192 seatable with a seat 193 to interrupt the flow of pressure fluid to piston 188 and is urged toward unseated position by a resilient means such as spring 194. Extending from the valve element 192 is a stem 195 having a head 196 thereon against which abuts a spring 197. The spacing between the end of spring 197 and an abutting portion 198 carried by the piston is such that when piston 188 has traveled the desired distance in its valve moving operation, the piston will pull valve element 192 to seated position by overcoming the force of spring 194. To permit retraction of the piston while valve element 192 is seated, it is provided with a vent 199 through which pressure fluid can bleed to the atmosphere via vent 200. Of course, valve element 192 is of the type which can be held in seated position by pressure from inlet port 170 or port 171. By properly sizing spring 194 and the area within seat 193, the valve element can be held in seated position by the pressure chosen to be applied through the inlet port. In this connection, spring 194 need only be strong enough to move the valve element to open position upon removal of pressure therefrom. Of course, the volumetric flow capacity of valve 192—193 should be considerably greater than that of the restricted passageway or vent 199 so that sufficient pressure can be built up behind the piston to move it even though the vent is constantly open.

In discussing the operation of the apparatus of FIGS. 5–10, let it be assumed that port 113 is connected to a 5 p.s.i. pressure source, port 126 to a 10 p.s.i. source and ports 155, 141 and 163 to 20 p.s.i. sources. Also assume the metering vessel is at an elevated pressure, such as 20 p.s.i., while it is filling. Of course, other pressures can be used as long as the differences between them is sufficient to yield the desired operation.

When tank 65 becomes filled, liquid will flow upwardly through vent 73 to raise float 136. This causes float pilot valve 139 to apply 20 p.s.i. pressure fluid from port 141 to port 170 of the pilot valve means. The application of such pressure causes piston 188 of actuator 168 to overcome spring 191 and shift valve element 162 to its second position where its further movement to its third position is prevented by the detent. In such position, 20 p.s.i. pressure fluid from port 163 is applied via port 165 and conduit 173 to the upper side of sampling tube piston 94. This drives the sampling tube downwardly since the 20 p.s.i. pressure applied to its upper side is greater than the 10 p.s.i. applied to its lower side through port 126. As the sample tube piston moves downwardly, it will eventually pass port 179 which has previously been exposed to 10 p.s.i. pressure. The resulting increase in pressure is applied through conduit 178, port 177 and passage 177a to move detent piston 184 downwardly to release valve element 162 for movement to its third position. Such movement will be caused by piston 188 of actuator 168 since pilot valve 139 is still continuing to apply pressure to port 170.

It will be noted that valve element 162 cannot move to its third position until the sampling piston has moved past port 179. This latter port is so situated that it is passed by the piston only after the sampling tube has perfected its seal with seal 112 to isolate the sample. As soon as this has happened, the detent 183 will be released as explained above and the valve element will be moved to its third position. In this manner, means are provided to maintain the pilot means in its second position until it receives a signal that the sample has been isolated.

After the sample tube has isolated the sample at seal 112, passed the pressure signal from port 179 to detent 183 and effected the shuttle valve movement, has over-traveled and has opened valve 106 as above described, the pressure in the sample space drops from meter pressure to that of the sample receiver (e.g. atmospheric). The 5 p.s.i. pressure from port 113 can now open check valve 116 to eject the sample.

As valve element 162 reaches its third position, abutment ring 198 of piston 188 of actuator 168 engages its spring 197 to seat valve element 192 thereby cutting off the flow of pressure fluid to the piston. The fluid holding the piston in its advanced position can now bleed off at a predetermined rate through restricted passage 199 so that the piston can be returned to its retracted position by its spring 191. This is true even though the pressure of fluid applied to port 170 has not yet been reduced.

When valve element 162 is in its third position, 20 p.s.i. pressure fluid will be applied from port 163 through port 164, pipe 172 and port 127 to the underside of valve operating piston 120. This raises this piston against the smaller force exerted by the 10 p.s.i. pressure acting through port 126. As the piston is raised, seal 81 will first enter bore 82 to interrupt the flow of liquid into metering vessel 65. Thereafter, face 79 will seal with seat 80 to interrupt flow of liquid into float chamber 135a. When valve member 78 has thus been fully seated, there is still a slight gap between nut 91 and bottom 93 of valve member 83 so that stem 77 must over-travel a slight distance before it can raise valve 83 from its seat. However, after it has done so, liquid will begin flowing out the metering vessel and will move paddle 150a to the right of the position shown in FIG. 7. Such movement bleeds off pressure applied to port 171 of the pilot means via conduit 176 and isolates the source of supply from port 157. Prior to this, 20 p.s.i. had been maintained at port 171 through ports 155 and 156 of FIG. 9, holding valve 192 closed against atmospheric pressure in the actuator 169. As port 171 is now vented to atmosphere through ports 156 and 157 of FIG. 9, the spring 194 re-opens valve 192 and renders the actuator 169 once again ready to respond to a fresh pressure signal. Upon the vessel becoming empty, flow of liquid will cease through outlet 74 and gas flow will take its place. The pressure differential across paddle 150a is thereby decreased enough that torsion spring 152 can swing it back to its FIG. 7 position. Such movement again causes 20 p.s.i. pressure to be applied to actuator 169 via conduit 176 and port 171. This causes actuator 169 to move valve element 162 back to its first position, the operation of actuator 169 being the same as that previously described for actuator 168. Movement of the valve element to its first position again isolates inlet port 163 and vents ports 164 and 165 and hence vents the cylinder above piston 94 and the cylinder below piston 120. This latter venting permits 10 p.s.i. pressure being applied through port 126 to move the sampling piston upwardly to retracted position and to move the valve operating piston downwardly. During the initial downward movement of the latter piston, spring 89 moves lower valve member 83 to its seated position. At such time, nut 90 is still spaced a slight distance from end 92 of the upper valve so that stem 77 must over-travel this slight distance before the upper valve is opened. Upon opening of the upper valve, liquid trapped in vent 73 and float chamber 135a flows back into vessel 65 to start a new cycle of operation. The reversion of shuttle valve 162 to its first position leaves valve 192 in actuator 169 closed and maintained closed by 20 p.s.i. to atmospheric differential until the next cycle. The venting of float level pilot 139 and port 170, on the other hand, allows valve 192 of actuator 168 to be re-opened by its spring 194 rendering this actuator once more in condition to respond to a fresh signal from the high level pilot 139.

While the swinging paddle "empty-signal" means of FIGS. 7–10 are preferred for several reasons, including the elimination of the problem of paraffin deposition, other arrangements are possible and within the scope of this invention. Thus, in FIGS. 11 and 12 there is shown a construction wherein a venturi tube 210 is connected to outlet 74 in place of the swinging paddle-pilot valve arrangement of FIGS. 7, 8 and 9. Otherwise, the construction at the lower end of the metering vessel is illustrated as being identical with that previously described. A throat connection or port 211 and an upstream connection or port 212 are provided so that upon liquid flow through the venturi, a pressure differential will exist between these two connections. The connections are in fluid communication respectively with ports 213 and 214 (FIG. 12) via suitable conduits (not shown).

The pilot valve of FIG. 12 has a valve element and various ports arranged in a manner similar to that shown in FIG. 10 and hence identical numbers have been applied to these corresponding parts. In this case, however, the construction of the actuating piston 188a is somewhat different from piston 188. Thus piston 188a is disposed for reciprocation in cylinder 214 and is urged to retracted position by spring 215. It carries a plurality of resilient latch fingers 216 which have shoulders 217 adapted to engage end 218 of valve element 162 when the piston is in retracted position so that upon application of pressure through port 170a, the piston can move the valve element to its second and third positions. The valve body is provided with a tapered portion 219 engageable with corresponding tapered portions 220 of latch fingers 216 to spread them apart and disengage them from head 218 of the valve element upon the piston 188a moving to the extreme position shown in FIG. 12. This construction permits valve element 162 to move back to its original position before pressure is removed from the piston to permit it to be retracted.

Here again detent means 183 are provided to releasably detain the valve element in its second position until the sampling tube has substantially completed its sample isolating stroke. This detent means includes a piston 184a, resilient means 187a biasing the piston to the position shown in FIG. 2 and a latch lever 221 provided on pin 222. The latch finger has an end 223 engageable with a shoulder 224 on the valve element to hold it after it has moved to its second position and prevent its further movement to its third position. The latch finger is urged to valve element engaging position by spring 222a.

A second latching means is provided to retain the valve element in its third position against the counter urging force of a resilient means, such as spring 227, until liquid flow ceases through venturi 210. Such means includes a latch lever 225 pivoted on pin 225a and having a shoulder 226 engageable with shoulder 227 on the valve element upon its movement to third position. Spring 225b causes the latch lever to so engage the valve element.

Means are also provided for releasing latch lever 225 responsive to the cessation of liquid flow through venturi tube 210. Such means includes a pressure responsive means, such as diaphragm 228, having one side (upper exposed to pressure upstream of the venturi from port 212 and another (lower) side exposed to venturi throat pressure from port 211. Moveable by the diaphragm, as by a pin 229, is a carrier 230 to which is pivoted a releasing finger 231. A spring 232 urges carrier 230 and releasing finger 231 upwardly upon a reduction in the differential of pressure applied to the diaphragm via ports 213 and 214. The lower end of finger 231 has a shoulder 234 which upon carrier 230 moving downwardly, engages a complementary shoulder 235 on latch lever 225. Upon carrier moving upwardly under the influence of spring 232, finger 231 causes latch lever 225 to be disengaged from the valve element so that the latter can move back to its first position under the influence of spring 227. As it does so, its shoulder 227 will strike the lower end of finger 231, which projects into the path of shoulder 227, and release the finger from engagement with latch lever 225. Retraction of finger 231, while engaged with shoulder 235, to a position too remote for the valve element to strike it to release the same is prevented by lever 225 abutting a stop 237.

In discussing the arrangement of FIGS. 11 and 12, let it be assumed valve element 162 is in its FIG. 12 position and piston 188a is in fully retracted position with shoulders 217 engaging end 218 of the valve element as shown in FIG. 16. Upon the liquid level sensitive device transmitting a pressure signal responsive to filling of vessel 65, such signal will be applied through port 170a to urge piston 188a and valve member 162 to the left in FIG. 12 until shoulder 224 abuts shoulder 223 of the detent means. With the valve element in that position, 20 p.s.i. pressure is applied from port 163 through port 165 to the sampling piston to move it downwardly. As soon as it has moved the sampling tube through substantially all of its sampling stroke, it passes port 179 so that 20 p.s.i. pressure is applied to detent port 177 to release the detent lever 221. Since the liquid level sensitive device is still applying a signal through port 170a, piston 188a will move valve element 162 to its third position or somewhat further allowing latch lever 225 to drop its shoulder 226 down into engagement with shoulder 227 to hold the valve element in such position. In actual practice, piston 188a will actually move the valve element slightly beyond its third position until resilient fingers 216 are spread apart by tapered part 219 to release the piston from the valve element. The valve element will then move back until its shoulder 227 engages shoulder 226. In such position, 20 p.s.i. pressure will be applied from port 163 through port 164 to move valve actuating piston 120 upwardly. Such movement, as described above, closes the upper valve and opens the lower valve so that liquid flows from the metering vessel. Upon such flow occurring, a pressure differential will be established between ports 211 and 212 which in turn is impressed upon diaphragm 228 to move it downwardly against the force of spring 232 so that the lower end of finger 231 engages shoulder 235 of latch lever 225. The mechanism is maintained in this position until liquid flow ceases through venturi 210 at which time the pressure differential between parts 211 and 212 will either cease to exist or be of such small magnitude (by reason of gas flowing through the venturi) that diaphragm 228 is moved upwardly by spring 232. This pulls lever 225 from its engagement with the valve element which is moved to the right by spring 227 during which movement it releases finger 231 from lever 225. With the valve element returned to its original position, ports 164 and 165 are open to their respective vents whereby the sampling tube piston and the valve actuating pistons are retracted to their original positions. This, of course, closes the lower valve and opens the upper valve permitting fluid trapped in the liquid float chamber to fall back into the metering vessel. As a result, the signal being applied to port 170a is cut off and this port is vented to atmosphere by float pilot valve 139. Then piston 188a is moved to retracted position during which movement its fingers 216 snap over the head 218 of the valve element ready to again start a new cycle of operation.

Referring now to FIGS. 13–16, there is illustrated an embodiment of a metering apparatus which does not incorporate the sampling apparatus of this invention. Its construction is similar to the metering construction previously described except that the control system has been modified somewhat and so description will be given only of the control system. Thus, the motor means is illustrated as a piston 120 reciprocal in a cylinder so as to open and close the upper and lower valves of sampling vessel 65. In this case, the motor means is returned to its original position by spring 250. The application of pressure fluid to the lower side of the piston through port 127 is controlled by suitable pilot means such as the one illustrated in FIGS. 15 and 16. This pilot means is constructed substantially the same as that described with reference to FIG. 12 except that the detent means 183 and port 165 have been eliminated with the consequence that valve element 162 only moves between two positions. These positions are such as to connect port 164 alternately with a vent and with pressure inlet port 163.

Thus in operation, as vessel 65 becomes filled, liquid will flow into float chamber 135a to raise float 136 so that actuating medium from port 141 is applied to piston 188a via conduit 175 and port 170a. This causes the piston to move the valve element to its FIG. 15 position. In such position, actuating medium from port 163 flows through port 164 and conduit 172 to the lower side of valve operating piston 120. Also movement of valve element 162 to its second position permits latch lever 225 to drop to the position shown in FIG. 15 to hold the valve element against the returning force applied by spring 227. When pressure is applied to valve operating piston 120, valve stem 77a begins to move upwardly. During its first increment of movement, the upper valve member seats in bore 82 of liquid inlet 72 and then seats with seat 80 to interrupt communication of vent 73 with metering vessel 65. The valve stem continues its upward movement through an over-travel during which stop 85a moves away from part 92 of the upper valve member. Thereafter, stop 90a of the stem engages part 89a of the lower valve member to move it to unseated position permitting liquid to flow from the metering vessel. Such flow creates a pressure differential between the throat and upstream ports 211 and 212 of venturi 210 (FIG. 13), this differential being communicated via conduits 211a and 212a to diaphragm 228 (FIG. 15) to move finger 231 so that it engages shoulder 235 on latch lever 225. As soon as liquid flow ceases through venturi 210, diaphragm 228 moves up so that latch lever 225 is released from the valve element permitting the latter to return to its original position and in so doing, knocking release finger 231 from engagement with lever 225. Port 164 is thus vented to atmosphere whereby spring 250 can move the valve operating piston 120 downwardly. The initial movement downward causes the lower valve member to be seated and after predetermined finite travel of the valve stem 77a a further distance downwardly, the upper valve member is unseated and the liquid trapped in the float chamber 135 runs back into the vessel, reversing the pilot 139, venting the cylinder 214 and allowing piston 188a to return to its starting position with its fingers 217 again engaging the end 218 of the shuttle valve all ready for the next cycle.

As illustrated in FIG. 13, the metering vessel can be equipped with a valve 260 adapted to admit gas from conduit 261 into the metering vessel during its emptying to facilitate the same. Valve 260 includes a valve member 262 urged towards seated position by spring 263.

The gas pressure at conduit 261, and also at conduit 135b of the float chamber 135, is normally that of the source from which comes the fluids flowing into the meter by gravity. The strength of the spring 263 is relatively little in excess of the minimum necessary to close the valve thus avoiding any appreciable reduction of that pressure difference between meter and discharge line which effects the discharge of the meter.

The metering vessel can also be equipped with a means for adjusting its capacity. In FIG. 13 such means is illustrated as comprising a plunger 264 having a sliding seal 265 with the metering vessel and adapted to be reciprocated various distances into and out of the vessel by means of an arrangement such as threaded stem 266. By rotation of the stem, varying amounts of plunger 264 can be protruded into the vessel to change its capacity. Capacity adjustment is usually desired for the initial calibration of the meter to give it a capacity equal to some standard unit and thereby compensating for minor variations in repetitive construction. It is to be understood that the manual means shown may be supplemented or replaced by automatic power operated means sensitive to one or more variable factors such as temperature, fluid density, etc., using equipment as is commercially available.

Also, a counter, such as at 267 in FIGS. 13 and 14, can be connected to some part of the apparatus which will actuate the counter each time the vessel goes through a cycle.

Referring now to FIGS. 17 and 18, there is illustrated a metering-sampling apparatus similar to that of FIG. 5 except that certain changes have been made to permit the apparatus to function as a displacement pump as well as a meter and sampler. For the sake of brevity and simplicity, only the upper portion of the apparatus has been shown and it will be understood that the remainder of that apparatus can be as shown in FIG. 5. Also, while the modification of a batching meter to also cause it to function as a displacement pump is shown with specific reference to FIGS. 5 to 10, it will be apparent that the modification is also applicable to other batching meters such as the non-sampling type meters illustrated in FIGS. 13 and 14.

Thus, the gas inlet valve 260 (as shown in FIG. 13) is replaced in FIG. 17 with a pressure actuated valve 270 adapted to be opened by the application of a control pressure to its diaphragm 271 to admit a relatively high pressure displacing gas to vessel 65, as from an inlet 272. Valve 270 is urged to a normally closed position by a spring 273.

The opening and closing of valve 270 is controlled by a four-position pilot or shuttle valve 274 which to some extent is similar to the valve of FIG. 10. However, it as well as the conduit connections to the fluid motors for operating the sampling tube and the inlet and outlet valves of the meter vessel, have been modified to permit vessel 65 to function as a positive displacement pump.

Thus, port 179 of FIG. 5 is no longer connected to the shuttle but instead is connected, as by conduit 275, to port 127 below piston 120. Thus, as the sampling tube completes its sampling stroke, the pressure of fluid from port 122 is applied, via conduit 275, to the lower side of piston 120 to thereby cause the upper valve to be closed and the lower one to be opened. Also, cylinder 121 is provided with a port 276 situated so that piston 120 passes thereabove only after the upper valve has been closed and the lower one opened. Port 276 is connected to port 177 of shuttle valve 274 as by conduit 277. Further, port 126, now communicates only with cylinder 95 below sampling tube piston 94 and the upper portion of cylinder 121 is in communication with another port 278. With this arrangement and assuming, for the purpose of discussion, that ports 113 and 126 are supplied with 5 p.s.i. and port 278 with 10 p.s.i. pressure fluids, then the application of 20 p.s.i. pressure fluid to port 122 will move sampling tube piston 94 downwardly until it passes port 179 thereby causing the pressure on the bottom of the piston 120 to increase from 5 p.s.i. to 20 p.s.i. (the 5 p.s.i. pressure being applied via ports 126 and 179, conduit 275 and port 127). Piston 120 will then be moved upwardly to close the upper valve and open the lower valve to permit discharge of liquid from vessel 65. Such movement also causes port 276 to be exposed to 20 p.s.i. fluid beneath piston 120 to release a detent as will be described below.

A preferred shuttle valve adapted for use in the system of FIG. 17 is shown in FIG. 18. It will be seen that it has many elements constructed similarly to correspondingly numbered elements of FIG. 10 and further description of these is not required. However, in this case the valve is provided with a second pressure actuated detent, designated generally by the numeral 280 and having the function of delaying operation of piston 120 to close the lower valve and open the upper valve until the pressure in vessel 65 has decreased to a desired value. In this manner, gas at elevated pressure in vessel 65 continues flowing out through the lower valve until the pressure in the vessel has diminished to be about equal to or less than the pressure of the liquid source at inlet 66. This prevents high pressure gas blowing back into the inlet conduit which would push the liquid back towards its source and considerably delay the metering process.

The second detent is shown as including a reciprocal rod 281 having an inner end 282 engageable with a shoulder 283 on valve element 162. The location of shoulder 283 will be described below. Rod 281 is urged to retracted position by spring 284 whose force can be overcome by the application of suitable pressure through port 285 to act on diaphragm 286. As shown in FIG. 17, port 285 is connected to the upper portion of vessel 65 by a conduit 287. Then by a proper choice of the strength of spring 284 and the size of diaphragm 286, rod 281 will be urged inwardly toward detaining position whenever the pressure in vessel 65 is above a predetermined value and will move outwardly to releasing position when the vessel pressure falls below such value.

In discussing the operation of the apparatus of FIGS. 17 and 18, let it be assumed for discussion purposes that 5 p.s.i. gas pressure is applied to ports 113 and 126, 10 p.s.i. pressure is applied to port 278 and 20 p.s.i. to port 163 of shuttle valve 274. Also assume the shuttle valve is in a first operating position as shown in FIG. 18. Piston 120 will then have 5 p.s.i. pressure on its lower side (from ports 126 and 179, conduit 275 and port 127) and 10 p.s.i. pressure on its upper side (from port 278). As a result, it will be held in its down position wherein the upper valve is open and the lower valve is closed thereby permitting vessel 65 to fill. Diaphragm 271 is then at atmospheric pressure due to venting via conduit 288, port 164 and vent 166 so that valve 270 is closed.

As soon as vessel 65 fills and liquid flows into the float chamber (not shown in FIG. 17) arranged as in FIG. 5, the float pilot will send a "full" signal to port 170 of shuttle valve 274 thereby moving valve element 162 to a second position. Movement past this position is prevented by pin 185 of detent 183 engaging shoulder 186 on the valve element. In the second position, inlet port 163 is in fluid communication with port 165 so that 20 p.s.i. pressure is applied to the sampler piston to move it downwardly. Upon movement of this piston past port 179, 20 p.s.i. pressure will be applied via conduit 275 to the lower side of piston 120. This moves piston 120 upwardly to close the upper valve and open the lower valve by emptying of the vessel. As piston 120 moves upwardly, it moves past port 276 whereby 20 p.s.i. fluid flows into conduit 277 and thence to port 177 through which it acts against piston 184 of detent 183 to release the detent. Since piston 184 of detent 183 is exposed to 10 p.s.i. pressure while piston 120 is below port 276 and to 20 p.s.i. while piston 120 is above port 276, spring 187 is adjusted so that it holds piston 184 in its inward position against the force of the 10 p.s.i. pressure but is overcome when such pressure is increased to 20 p.s.i.

As soon as detent 183 has been moved to released position, valve element 162 is moved to a third position where it abuts its end 190 against end 189 of piston 188 of actuator 169. This movement is by virtue of the fact that the float pilot valve is still applying a signal through port 170. Upon movement of the valve element 162 to its third position, piston 188 seats valve element 192 and then is moved to its retracted position.

In the third shuttle valve position, 20 p.s.i. pressure is applied from port 163 to port 164 and thence via conduit 287 to open valve 270. This admits high pressure displacement gas to vessel 65 so that liquid is forced out into the receiver therefor. Opening of valve 270 thus increases the pressure in vessel 65 which increased pressure acts on diaphragm 286 to overcome spring 284 and move rod 281 inwardly so that its end 282 can engage shoulder 283 of valve element 162. However, valve element 162 is at this time still in its third position so that shoulder 283 is spaced from end 282 of the second detent.

It will thus be seen that closing of the upper valve and opening of the lower valve of vessel 65 results in operation of detent 183 so that the shuttle valve can move to a third position where it causes valve 270 to open and vessel 65 to become pressured up. In this connection, port 276 is situated so that piston 120 does not move upwardly therepast until the upper valve is closed. Such an arrangement prevents displacement gas from blowing back into meter inlet 66. This blowing back into meter inlet 66 would not only push liquid in the inlet back towards its source but, more important, would blow some of the liquid in vessel 65 back into the inlet thereby rendering the metering inaccurate.

Upon vessel 65 emptying, an "empty" signal is sent to port 171 of shuttle valve 274 as by the arrangement of FIG. 7. This causes valve element 162 of the shuttle valve to move to a fourth position where its shoulder 283 abuts end 282 of the second detent. In this position, diaphragm 271 of valve 270 is vented via conduit 288, port 164 and vent 166 thereby allowing valve 270 to close. However, the outlet valve of vessel 65 remains open permitting displacement gas to flow from the vessel to reduce the pressure therein. When the desired pressure reduction has been achieved which is no longer sufficient to act on diaphragm 286 to hold pin 281 inwardly, spring 284 moves the pin outwardly to release valve element 162. The latter is then returned to its first position due to the empty signal yet being applied through port 171. Movement to the first position causes piston 188 of actuator 169 to seat its valve element 192 whereupon the piston can return to its retracted position.

With valve element 162 in its first position, the upper side of sampling tube piston 94 is vented to atmosphere via conduit 173, port 165 and the clearance between shuttle valve body 161 and valve element 162 on the detent side of seal 180. This venting also reduces the pressure on the lower side of piston 120 by virtue of ports 179 and 127 being connected by conduit 275. The sampling tube piston 94 does not move upwardly to be above port 179 until the pressure above this piston and hence that below piston 120 has decreased to be less than that in port 126. As a result, the differential of pressure initially applied across piston 120 to move it downwardly is greater than that which exists between ports 126 and 278. Since the design is such the pressure differential between ports 126 and 278 is sufficient to move piston 120 downwardly and hold it in down position, the greater initial differential pressure applied to piston 120 is always more than adequate to initiate movement of this piston. As soon as the sampling tube piston moves upwardly, port 179 is again exposed to 5 p.s.i pressure from port 126 but as before stated, the differential between this port and port 278 is designed so that it is sufficient to assure proper operation of piston 120.

It will be evident from the foregoing that here again seals 180, 181 and 182 are spaced on valve element 162 and relative to ports 163, 164 and 165 and to the various vents that the control of pressurizing and venting is as above described. Also, while specific reference has been made above to 5, 10 and 20 p.s.i. pressures, these can be varied as long as their relative amplitudes are sufficient to achieve the functions of each pressure as above described.

While considerable specific reference has been made herein to control equipment and actuators of the pneumatic and hydraulic type, it is contemplated that various equivalent electrical components can be substituted for many pneumatic or hydraulic components. In fact, the entire control system and the sampling tube and flow valve actuating motors can be substituted by corresponding electrical controls and motors. However, pneumatic components are preferred not only because of elimination of fire hazards, but also because of their simplicity and relative infallibility of operation.

From the foregoing it will be seen that this invention is one well adapted to attain all of the ends and objects hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A metering apparatus adapted to be mounted on a metering vessel to batch flow therethrough comprising upper and lower valve assemblies respectively including inlet and vent passageways and an outlet passageway, first and second valve members controlling flow through said inlet and vent passageways and through said outlet passageway, respectively, and moveable toward unseated positions in respectively opposite directions, a valve stem having a lost motion connection with each valve member so that axial movement of the stem in one direction seats the first valve member and thereafter unseats the second valve member and axial movement of the stem in an opposite direction seats the second valve member and thereafter unseats the first valve member, resilient means opposing movement of the valve members from seated position, motor means for moving said stem axially, and means controlling said motor means to cause it to move the stem in said one direction responsive to liquid flow out said vent passage and in said opposite direction responsive to cessation of liquid flow through said outlet passage.

2. The apparatus of claim 1 wherein the vent passageway and first valve member have mating seating surfaces which are positioned relative to mating seating surfaces on the inlet passageway and first valve member such that the last mentioned surfaces mate to interrupt flow through the inlet passageway prior to the first mentioned surfaces mating to interrupt flow out the vent passageway.

3. The apparatus of claim 1 wherein said inlet and vent passageways have seats concentric with each other and coaxial with a seat around said outlet, said valve members being of the disc type and said stem extending through the first valve member.

4. The apparatus of claim 1 in combination with a sample core extending from the uppermost to the lowermost level in said vessel, a sample tube telescopingly reciprocal over said core, the core being of varying cross-section along its length relative to the corresponding internal cross-section of said tube such that the cross-sectional area therebetween at any level bears a constant relationship to the cross-sectional area of the vessel at the same level therein, a second motor means telescoping said tube over said core responsive to liquid flow out said vent passage and thereafter moving said tube in said one direction so that a sample is isolated prior to beginning emptying said vessel, and means for emptying a sample isolated between the tube and core into a reservoir therefor responsive to the tube moving into position to isolate said sample.

5. A valve apparatus for use in controlling flow into and out of a vessel through which liquid is batched to meter the same comprising: an upper valve assembly including a liquid inlet adapted to be situated so that its terminus is at an uppermost point in the vessel, a vent having an inlet situated above said terminus, an upper disc-type valve member moveable to seat and close both said liquid inlet and vent; a lower valve assembly including a liquid outlet adapted to be situated at a lowermost point in said vessel, a lower disc-type valve member seatable in said outlet to interrupt flow therethrough; the upper and lower valve members when seated conforming to the respectively adjacent contours of the vessel so that the volume of the vessel is substantially the same as it would be if the walls thereof were extended across said liquid inlet and outlet in conformity with said adjacent contours; and a valve stem interconnecting said valve members to alternately open and close the same.

6. The apparatus of claim 5 in combination with a liquid displacing core disposed through both of said valve members, a sample tube telescopingly reciprocal through said upper valve member over said core, said core and tube having a sample space therebetween extending from one of said levels to another, said space varying in cross-sectional area from said one level to another such that the ratio of the cross-sectional area of the space to the cross-sectional area of the vessel remains constant at all depths between said one and another levels.

7. A metering apparatus comprising a vessel having a liquid inlet and vent in an uppermost portion and a liquid outlet in the lowermost portion substantially opposite said inlet and vent; first and second valve members controlling flow respectively through said inlet and vent and through said outlet, the first valve member being moveable in one direction to its unseated position and the second valve member in an opposite direction to its unseated position; a force transmitting linkage between said first and second valve members and having a lost motion connection with each so that upon movement of the linkage in said one direction, the second valve member is seated and the first valve member is thereafter unseated and upon movement of the linkage in said opposite direction, the first valve member is seated and the second valve member is thereafter unseated; a liquid-sensing device connected to said vent and situated at an elevation above the upper extremity of the vessel and operable to give a signal upon liquid filling said vessel and flowing through the vent upwardly to said device; and power means for moving said linkage in said opposite direction responsive to a signal being received from said liquid-sensing device and in said one direction upon said vessel emptying of liquid.

8. A metering vessel comprising a vessel having an inlet and vent in the uppermost portion and an outlet in the lowermost portion, said inlet and vent each having a valve seat substantially concentric with each other and coaxial with an oppositely facing seat around said outlet, an upper annular valve member moveable in one direction to seat first with the inlet seat and then with continued movement to also seat with the vent seat, the inlet and vent being in fluid communication across the vent seat prior to seating of the upper valve member on the vent seat; a lower valve member moveable in a direction opposite to said one direction to seat with the outlet seat; resilient means biasing the valve members toward seated position; a valve stem extending through first valve member and having parts engageable with said valve members to unseat the same upon reciprocation of the stem, said parts being spaced apart a distance great enough that upon disengagement of one part from one valve member, the stem must move a predetermined further distance before the other part can engage the other valve member; fluid motor means connected to the stem for reciprocating the same; a liquid level sensing device in fluid communication with the vent and situated thereabove so that liquid flows into contact with said device to actuate the same only after the vessel is liquid full; a liquid velocity sensing device connected to said outlet; pilot means controlling flow of actuating fluid to said motor and connected to each of said liquid level and velocity sensing devices to receive signals therefrom and operable upon receipt of a signal from the liquid level sensing device to cause said motor means to move the stem to seat the first valve member and unseat the second valve member and upon receipt of a signal from the liquid velocity sensing device to cause the motor means to seat the second valve member and unseat the first valve member.

9. The apparatus of claim 8, wherein said valve stem is tubular, a fluid displacing core inside the stem and extending from one end of the vessel to the other, a sampling tube telescopingly reciprocal over the core and inside the stem, the cross sectional area of the core varying along its length such that the ratio of the cross-sectional area of the space between the core and tube to the cross sectional area of the vessel is constant for all levels in the vessel, a fluid motor connected to the sampling tube to reciprocate the same, said pilot means also controlling flow to the tube motor and operable to cause the stem to seat the first valve member and unseat the second valve member responsive to the sampling tube being telescoped to sample isolating position over the core; and sample discharge means communicating with the space between the core and tube and including a sample discharge valve openable to permit discharge of a sample responsive to the sample tube telescoping over the core beyond sample isolating position.

10. The apparatus of claim 9, wherein a seal is carried by one of the tube and core to seal therebetween upon the sample tube moving to sample isolating position, and wherein said sample discharge means includes a first passageway having an inlet open to the space between the core and tube on one side of said seal and an outlet at the periphery of the core on the other side of said seal, a second passageway having an inlet at the periphery of the core spaced longitudinally from the outlet of the first passageway and an outlet exteriorly of said vessel, and wherein said sample discharge valve is a sleeve valve moveable from a first to a second position by said sample tube while said tube is in sample isolating position, said sleeve valve in said first position providing fluid communication between the first passageway outlet and the second passageway inlet and in second position interrupting fluid communication therebetween so that the sample can be discharged only while the tube is in sample isolating position.

11. The apparatus of claim 10 in combination with means including a passageway communicating with the space between the core and sample tube to introduce fluid thereinto to assist in discharging a sample, and a valve controlling flow through said passageway and openable upon said tube moving said sleeve valve to its first position.

12. In a metering and sampling apparatus wherein a vessel has inlet and outlet valves alternately opened and closed to batch liquid through the vessel and wherein a cross-section sampling device is provided to take a sample from the vessel while it is full and before it is emptied, the improved control mechanism therefor comprising liquid sensing means adapted to send a signal each time the vessel becomes full and empty, motor means operating said valves and sampling device, and control means controlling said motor means comprising a shuttle valve connected to the liquid sensing means to receive signals therefrom, said shuttle valve being positionable in three operating positions in the first of which the valves are actuated to close the outlet valve and open the inlet valve and in the second of which the motor means is actuated to cause the sampling device to take said sample and in the third of which said valves are actuated so as to close the inlet valve and open the outlet valve, means for placing the control means in said second operating position responsive to receipt of signal from the liquid sensing means that the vessel is full and for maintaining the control means in such second position until said sampling device has isolated said sample and then causing it to move to its third operating position, and means for placing the shuttle valve in its first position responsive to the receipt of a signal from said liquid sensing means that the vessel is empty.

13. The apparatus of claim 12, wherein said liquid sensing means includes a part disposed in the outlet of the vessel and moveable responsive to liquid flow and cessation thereof through the outlet and means transmitting a signal to the shuttle valve responsive to movement of said part with cessation of liquid flow through the outlet so that the shuttle valve is placed in its first position responsive to receipt of the last mentioned signal.

14. In a metering and sampling apparatus wherein a vessel has an inlet and an outlet governed by inlet and outlet flow valves which are alternately opened and closed to batch liquid through the vessel and wherein a cross-section sampling device is provided to take a sample from the vessel while it is full and before it is emptied, a first fluid motor means connected to said valves and a second motor means connected to the sampling device such that upon actuation of the second motor means in a first movement, the sampling device takes a sample and in a subsequent second movement of the first motor means the inlet and outlet valves are respectively closed and opened and, in a still subsequent third movement of both motor means, the sampling device is returned to a position to take another sample and the inlet and outlet valves are respectively opened and closed, a pilot valve connected to and controlling flow of actuating fluid to both said motor means and having a valve element positionable in second, third and first positions to respectively control flow of fluid to and from both the motor means to actuate them in their first, second and third movements, means positioning the valve element in its second and first positions respectively responsive to filling and emptying said vessel and for moving the valve element from the second to the third of its positions responsive to a signal, and means transmitting a signal to said pilot valve responsive to said second motor means completing its first movement to cause said valve element to move from said second to said third position.

15. The apparatus of claim 14 wherein said motor means comprises first and second pistons reciprocally mounted in cylinders therefor and respectively connected to actuate said sampling device and said valve members, the first piston causing such signal transmitting means to transmit said signal upon completion of said first movement.

16. In a metering and sampling apparatus wherein a vessel has an inlet and an outlet governed by inlet and outlet valves which are alternately opened and closed to batch liquid through the vessel and wherein a cross-section sampling device is provided to take a sample from the vessel while it is full and before it is emptied, first and second pistons respectively mounted in cylinders and connected respectively to said sampling device and to said inlet and outlet valves such that movement of the first piston in one direction causes the sampling device to take a sample and movement of the second piston in a first direction closes the inlet valve and opens the outlet valve and in a second direction opens the inlet valve and closes the outlet valve, a three-way pilot valve connected to control flow of actuating fluid to said piston and positionable in second, third and first positions to respectively apply actuating fluid to the first piston, apply actuating fluid to the second piston and interrupt the application of actuating fluid as aforesaid, means applying force to move the pilot valve from its first to its second and then to its third positions responsive to said vessel becoming filled, means normally preventing movement of the pilot valve from its second to its third position and releasable to permit such movement responsive to said first piston moving in said one direction until the said sampling device has completed the taking of a sample, and means for moving the pilot valve from its third to its first position responsive to emptying of said vessel.

17. The apparatus of claim 16 wherein said force applying means includes a liquid level sensitive device permitting flow of actuating fluid to said pilot valve upon the vessel becoming filled, said force applying means being actuated by such flow of actuating fluid to urge the pilot valve from its first through its second to its third positions, said movement preventing means including a detent engaging the pilot valve to prevent its movement from its second to its third positions, pressure responsive means for releasing said detent, and means for applying pressure to said pressure responsive means upon the first piston moving in said one direction as aforesaid.

18. In a metering apparatus wherein a vessel has inlet and outlet valves alternately opened and closed to batch liquid through the vessel, the improved control mechanism therefor comprising motor means operable to so open and close said valves, control means connected to the motor means and positionable in at least two operating positions in the first of which the control means causes the motor means to open the inlet valve and close the outlet valve and in the second of which it causes the motor means to close the inlet valve and open the outlet valve, means moving the control means to its second position responsive to filling said vessel, means urging the control means to its first position, detent means releasably engageable with said control means when in its second position to retain it in such position, differential pressure responsive means connected to the detent to release the same, and means in the outlet of said vessel generating a relatively large differential pressure while liquid is flowing through said outlet and generating a relatively lesser differential pressure upon cessation of liquid flow through said outlet, said differential pressure responsive means being connected to said generating means to be actuated to release said detent upon said differential pressure decreasing to the lesser value.

19. The apparatus of claim 18 in combination with a sampling apparatus for taking a sample from the vessel each time it is filled and before it is emptied and operated by said motor means, the control means being positionable in a third operating position to cause the motor means to cause the sampling apparatus to take a sample before said outlet valve is opened, means releasably preventing movement of the control means from its third to its second position, and means for releasing said preventing means responsive to the motor means causing the sampling apparatus to take a sample whereby the control means can then move to said second position to cause the motor means to close the inlet and open the outlet valve.

20. In a metering apparatus wherein a vessel has inlet and outlet valves alternately opened and closed to batch liquid through the vessel and wherein a valve is provided to control flow of displacing gas into the vessel to permit discharge of metered liquid at a pressure higher than that of its source, the improved control mechanism therefor comprising a first motor means operable to so open and close said inlet and outlet valves, a second motor means operable to open the displacing gas valve control means connected to both motor means and positionable in at least three operating positions in the first of which the control means causes the motor means to open the inlet valve and close the outlet valve and in a second of which it causes the motor means to close the inlet valve and open the outlet valve and in a third of which it causes the displacing gas valve to open, means urging the control means from its first through its second to its third position responsive to filling said vessel, means preventing movement of the control means from its second to its third position and releasable responsive to the inlet valve being closed, and means urging the control means from its third to its first position responsive to emptying said vessel.

21. The apparatus of claim 20 wherein the control means is also positionable in a forth position in which it causes the displacing gas valve to close, and means preventing movement of the control means from its third to its fourth position and releasable responsive to the pressure in said vessel decreasing to a predetermined value.

22. The apparatus of claim 20 in combination with means for taking a sample from said vessel after it has filled and before it has started to empty, a motor for operating said sample means, said control means being connected to the sample means motor to cause it to actuate the sample means to take a sample while the control means is in its second position, and means delaying actuation of the motor means to close the inlet valve and open the outlet valve until said motor has so actuated the sample means.

23. In a metering apparatus wherein a vessel has inlet and outlet valves alternately opened and closed to batch liquid through the vessel and wherein a valve is provided to control flow of displacing gas into the vessel to permit discharge of metered liquid at a pressure higher than atmospheric, the improved control mechanism therefor comprising a first motor means operable to so open and close said inlet and outlet valves, a second motor means operable to open the displacing gas valve control means connected to both motor means and positionable in at least three operating positions in the first of which it causes the motor means to open the inlet valve and close the outlet valve and in a second of which it causes the motor means to close the inlet valve and open the outlet valve and in a third of which it causes the displacing gas valve to open, and means for moving the control means from its first to its second position responsive to filling the vessel and then to its third position responsive to closing said inlet valve and then to its first position responsive to emptying of the vessel.

24. A metering apparatus comprising a vessel having an inlet at the top and an outlet at the bottom; and means for alternately filling and emptying the vessel, including an inlet valve disposed to open and close said inlet, an outlet valve disposed to open and close the outlet, a single valve motor disposed to alternately close one of said valves and then open the other, and means for actuating said valve motor responsive to the filling of the vessel to actuate the valve motor to close the inlet valve and then to open the outlet valve, and actuated by a predetermined decrease in velocity of liquid flowing in the outlet to actuate the motor to close the outlet valve and open the inlet valve, the means for actuating the valve motor includes a venturi tube in the outlet, a throat port in the venturi tube and an upstream port in the outlet providing a velocity responsive pressure differential between the ports.

References Cited in the file of this patent

UNITED STATES PATENTS

| | | |
|---|---|---|
| 966,270 | Van Leir | Aug. 2, 1910 |
| 1,114,360 | Hanung | Oct. 20, 1914 |
| 1,603,712 | Peck | Oct. 19, 1926 |
| 1,691,070 | Hurlbrink | Nov. 13, 1928 |
| 1,739,731 | Osborne | Dec. 17, 1929 |
| 1,740,875 | Porte | Dec. 24, 1929 |
| 2,158,381 | Raymond | May 16, 1939 |
| 2,164,498 | Clark | July 4, 1939 |
| 2,208,820 | Farris | July 23, 1940 |
| 2,351,764 | Jarrett | June 20, 1944 |
| 2,406,284 | Fitch | Aug. 20, 1946 |
| 2,872,817 | Pitts | Feb. 10, 1959 |

FOREIGN PATENTS

| | | |
|---|---|---|
| 394,877 | Germany | May 9, 1924 |
| 947,663 | France | Jan. 17, 1949 |